United States Patent [19]
Lange et al.

[11] Patent Number: 6,163,794
[45] Date of Patent: Dec. 19, 2000

[54] NETWORK SYSTEM EXTENSIBLE BY USERS

[75] Inventors: Danny Lange, Cupertino; Barbara Nelson, San Mateo; Jing Su, Cupertino; James E. White, San Carlos, all of Calif.

[73] Assignee: General Magic, Sunnyvale, Calif.

[21] Appl. No.: 09/178,366

[22] Filed: Oct. 23, 1998

[51] Int. Cl.[7] .................................................. G06F 15/16
[52] U.S. Cl. .......................................... 709/202; 709/226
[58] Field of Search .................................... 709/202, 203, 709/205, 204, 224, 226, 225, 228, 229, 223, 317; 707/10, 9, 104; 379/88.13, 88.19, 88.17

[56] References Cited

PUBLICATIONS

JP Morgenthal, "XML Agents," NC.Focus website (www.ncfocus.com), 1998, pp. 1–4.
D. Tsichritzis, et al., "KNOs: Knowledge Acquisition, Dissemination, and Manipulation Objects," ACM Transactions on Office Information Systems, vol. 5, No. 1, Jan. 1987, pp. 96–112.

C. Daniel Wolfson, et al., "Intelligent Routers," The 9th International Conference on Distributed Computing Systems, IEEE Computer Society Press, 1989, pp. 371–376.

*Primary Examiner*—Mehmet B. Geckil
*Attorney, Agent, or Firm*—Philip W. Woo, Esq.; Skjerven Morrill et al.

[57] ABSTRACT

In one aspect, a network system includes a user interface which allows a user to interact with the network system. An agent server is coupled to the user interface. The agent server manages the operation of the network system. Furthermore, the agent server in conjunction with the user interface is operable to create or modify an agent in response to interaction by the user. In another aspect, a network system includes an agent server which manages the operation of the network system. An agent is operable to utilize a service within the network system. A service wrapper, associated with the service, cooperates with the agent server to mediate interaction between the service and the agent.

63 Claims, 17 Drawing Sheets

Microfiche Appendix Included
(10 Microfiche, 713 Pages)

NETWORK SYSTEM EXTENSIBLE BY USERS

CROSS-REFERENCE TO RELATED APPLICATIONS

This Application relates to the subject matter disclosed in the following United States Patent and co-pending United States Applications:

U.S. Pat. No. 5,603,031 to White et al., entitled "System and Method For Distributed Computation Based Upon the Movement, Execution, and Interaction of Processes In a Network;"

U.S. Pat. No. 5,953,392 to Rhie et al., entitled now U.S. Pat. No. 5,953,392 issued on Sep. 14, 1999, "Method and Apparatus For Telephonically Accessing and Navigating the Internet;"

U.S. Pat. No. 6,016,393 to White et al., now U.S. Pat. 6,016,393 issued on Jan. 18, 2000, entitled "System and Method For Distributed Computation Based Upon the Movement, Execution, and Interaction of Processes In a Network;" and U.S. application Ser. No. 09/071,717, filed May 1, 1998, entitled "Voice User Interface With Personality."

The above patent and co-pending applications are assigned to the present Assignee and are incorporated herein by reference.

TECHNICAL FIELD OF THE INVENTION

The present invention relates generally to the field of computer software systems and, more particularly, to a network system extensible by users.

CROSS-REFERENCE TO MICROFICHE APPENDICES

A portion of the disclosure of this patent document contains material that is subject to copyright protection. The copyright owner has no objection to the facsimile reproduction by anyone of the patent disclosure as it appears in the Patent and Trademark Office patent files or records, but otherwise reserves all copyright rights whatsoever.

BACKGROUND OF THE INVENTION

Advances in computer and telephony systems have led to the development of numerous technology-driven services, such as electronic mail (e-mail), voice mail, electronic organizers (for appointments and addresses), on-line databases (e.g., for periodicals and stock quotes), and the like. An increasing popularity for these technological services in recent years has spawned an entire industry devoted to the provision and integration of the same. For example, numerous companies now offer e-mail service over the interconnection of computers widely known as the Internet. Other companies offer systems for voice mail services in both private branch exchange (PBX) and public telephone environments. Entities which offer, supply, or otherwise provide services are referred to as "service providers." Entities which purchase, consume, or otherwise use services are referred to as "subscribers."

Many technological services are supported by one or more software applications. These software applications are often developed with a broad spectrum of subscribers in mind. As such, the respective technological services may address the generalized needs of many subscribers,,but not the specialized needs of any one particular subscriber or group of subscribers.

With previous techniques, when a subscriber desires to alter, change, modify, or otherwise customize a service to suit his or her own specialized needs, that subscriber must contact the appropriate service provider. If the service provider deems that there is sufficient demand for such customization, the provider will initiate a modification of the supporting software application for the relevant service. Software programmers or developers must then modify the existing software application to address the specialized needs of the requesting subscriber(s), and afterwards, test the modified software to ensure that it is functioning properly. Many iterations of modification and testing may be performed before the finished, customized service is available to the subscriber.

In light of the above, it is clear that previous techniques are problematic for numerous reasons. For example, a service provider is required to maintain or otherwise employ a staff of human software developers for making modifications to supporting software applications. This can be expensive. Furthermore, a substantial amount of time may be required to develop, modify, and test supporting software applications in response to the request of a particular subscriber or group of subscribers. This can lead to subscriber dissatisfaction, and ultimately, defection to another service provider.

SUMMARY OF THE INVENTION

The disadvantages and problems associated with previous techniques for providing technological services have been substantially reduced or eliminated using the present invention.

The present invention provides a network system extensible (e.g., programmable) by "end-users," and a method of operation for the same. In general, an end-user (or simply "user") is any individual, party, or entity which somehow interacts with the network system. A user can thus be an entity known to the network system (i.e., an entity having a log-in ID), such as, for example, a subscriber and or an individual affiliated with the service provider. A user can also be an arbitrary third-party which somehow interacts with the network system.

With the present invention, users may extend or customize the network system according to their own particular needs. To accomplish this, a network system is augmented with an agent system. Capabilities of the network system are programmatically exposed by means of one or more services, service resources, and service wrappers. Each service individually, or the network system as a whole, can be extended by adding agents (created by users). Furthermore, the consumption of computational and service resources are monitored within the network system, thus protecting the subscribers and the service provider from harm or misuse, whether intentional or inadvertent. Accordingly, the network system can admit agents programmed by users.

In addition, the present invention contemplates that a third party may modify existing agents and create new agents in the case where subscribers lack the desire or sophistication to do so themselves. The third party can then make such customized agents commercially available to subscribers.

According to an embodiment of the present invention, a network system includes a service. An agent uses the service on behalf of a principal. An agent server mediates the use of the service by the agent.

According to another embodiment of the present invention, a network system includes a user interface which allows a user to interact with the network system. An agent server is coupled to the user interface. The agent server manages agent use of the network system. Furthermore, the agent server in conjunction with the user interface is operable to create or modify an agent in response to interaction by the user.

According to yet another embodiment of the present invention, a method includes the following: admitting a user to a network system wherein at least one agent is operable to utilize a service to perform a task for the user; and allowing the user to create or modify the agent within the network system.

According to still another embodiment of the present invention, a network system includes an agent server which manages agent use of the network system. An agent is operable to utilize a service within the network system. A service wrapper, associated with the service, cooperates with the agent server to mediate interaction between the service and the agent.

According to yet another embodiment of the present invention, a method includes the following: allowing an agent to utilize a service; and mediating interaction between the service and the agent.

A technical advantage of the present invention includes providing a network system (and a method of operation therefor) which is programmable by users (including subscribers) according to their own particular needs. From the standpoint of subscribers, this facilitates the process of adding or deleting new services or extending existing services and, from the standpoint of a service provider, this is beneficial in that human software developers and testers can be reduced or eliminated altogether with the automated system of the present invention.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

Figure 1:
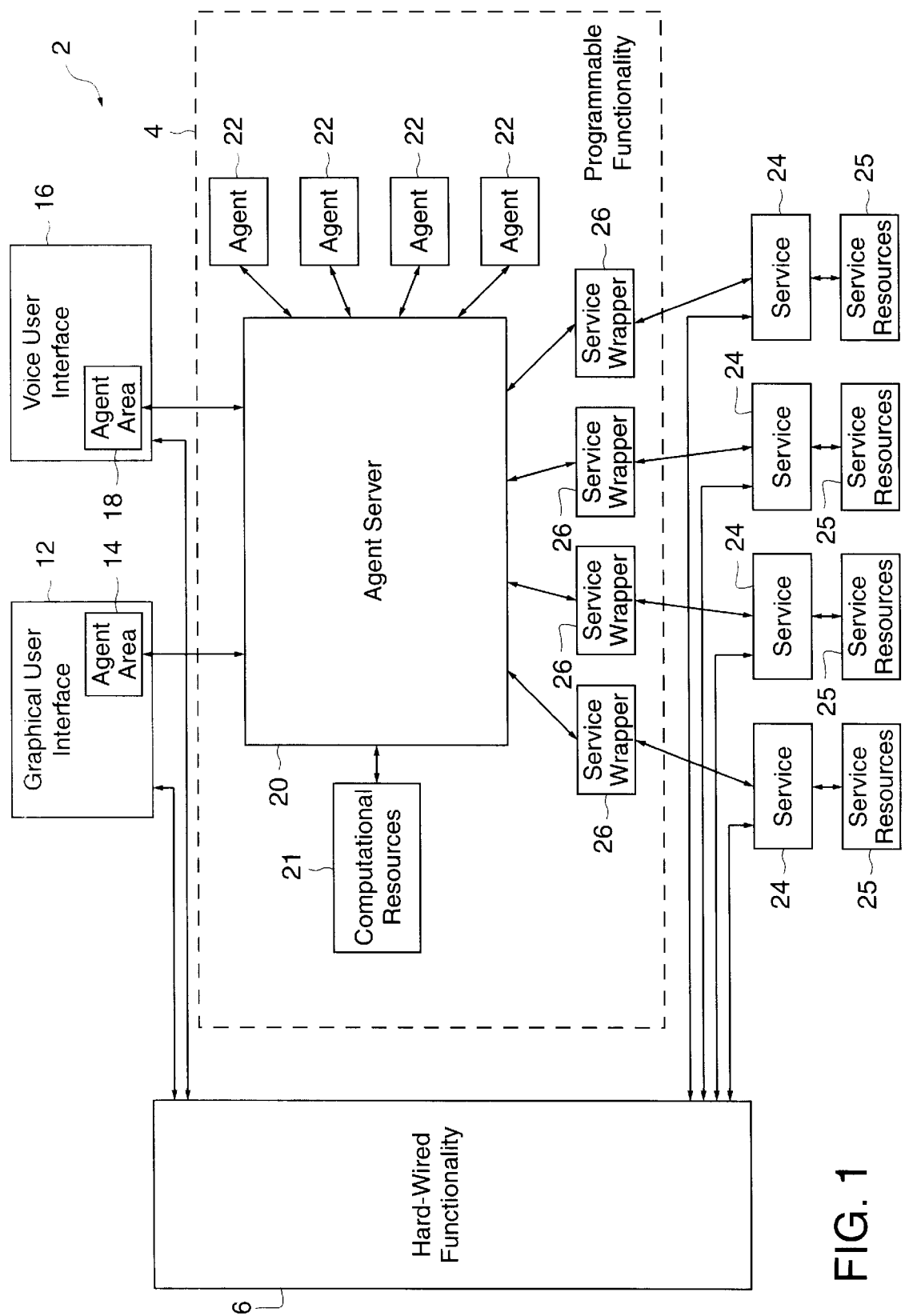
FIG. 1 illustrates a network system extensible by users, according to an embodiment of the present invention.

The preferred embodiments of the present invention and their advantages are best understood by referring to FIGS. 1 through 17 of the drawings. Like numerals are used for like and corresponding parts of the various drawings.

Turning first to the nomenclature of the specification, the detailed description which follows is represented largely in terms of processes and symbolic representations of operations performed by conventional computer components, such as a central processing unit (CPU) or processor associated with a general purpose computer system, memory storage devices for the processor, and connected pixel-oriented display devices. These operations include the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, or the like, which are often associated with manual operations performed by a human operator. It must be understood that no involvement of the human operator may be necessary, or even desirable, in the present invention. The operations described herein are machine operations performed in conjunction with the human operator or user that interacts with the computer or computers.

In addition, it should be understood that the programs, processes, methods, and the like, described herein are but an exemplary implementation of the present invention and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read-only memory (ROM).

Network System Overview

Referring now to the drawings, FIG. 1 illustrates a network system 2 extensible by users, according to an embodiment of the present invention. To achieve this, network system 2 may incorporate an agent system comprising an agent server and one or more agents, as described below in more detail. An exemplary construction for an agent system is taught by U.S. Pat. No. 5,603,031, issued to the Assignee of the present invention, the text of which is incorporated herein by reference.

It is contemplated that network system 2 may be maintained, managed, and/or operated by any provider of technological services, such as electronic mail (e-mail), voice mail, electronic organizer (for appointments and/or addresses), on-line data retrieval (for, e.g., periodicals and stock quotes), and the like. These services are offered and/or provided to one or more users who may be considered to be "subscribers." Each of the provider and the subscribers can be an individual, a business, a governmental department or agency, an academic institution, an organization, or the like, which provides or receives, respectively, any form of technological service.

The following primarily describes how network system 2 and its associated methods of operation can be used to provide information technology services over a telephony system. Furthermore, a model of a network system providing telephony services is discussed in detail in microfiche Appendix A, in accordance with one embodiment of the present invention. It should be understood, however, that the present invention is not so limited. That is, the teachings of the present invention generally encompass the provision of services by agents to one or more users in an environment which can be extended by the users, for example, by programming additional agents.

Network system 2 includes a programmable functionality component 4 and a hard-wired functionality component 6. In general, programmable functionality component 4 and hard-wired functionality component 6 each functions to provide and/or support the provision of technological services. Hard-wired functionality component 6 is implemented substantially with a number of "hard-wired" elements, and thus, its functionality is modified or changed primarily by connecting or re-connecting the same or additional elements. Programmable functionality component 4 is implemented with an agent system and, as such, its functionality can be programmed (for example, by subscribers or third parties), as described below in more detail. Computer code for an exemplary agent system implementing a programmable functionality component 4 is provided in microfiche Appendix B, in accordance with an embodiment of the present invention.

Graphical User Interface

Network system 2 includes a graphical user interface (GUI) 12. Graphical user interface 12 may be implemented and/or supported by a web browser—i.e., a client application that resides on (or is downloaded to) an electronic user device, such as a desktop computer. Any of a variety of browsers are available, such as NETSCAPE NAVIGATOR, MICROSOFT INTERNET EXPLORER, and others. The web browser can be a forms-capable browser which is able to interpret Hyper Text Markup Language (HTML) code which provides forms including fill-in text boxes, option buttons, drop-down list boxes, radio buttons, and the like.

Graphical user interface 12 allows a user to interact with network system 2 via a communication line, which may be any type of communication link capable of supporting data transfer. For example, the communication line may include any combination of an Integrated Services Digital Network ("ISDN") communication line, a hard-wired line or a telephone line. This enables communication via the interconnection of computers popularly known as the "Internet," using any suitable protocol, such as, Transmission Control Protocol/Internet Protocol (TCP/IP), Internetwork Packet eXchange/Sequence Packet exchange (IPX/SPX), or AppleTalk.

Graphical user interface 12—comprising a web browser and a web server—manages the connection between the user device and network system 2, supports the transfer of data therebetween, and interprets and displays the data. For example, graphical user interface 12 enables the downloading of one or more web pages (serving as graphical interfaces into network system 2) to the user device. The user device may include one or more suitable input devices, such as a keyboard, key pad, touch screen, input port, pointing device (e.g. mouse), and/or other device that can accept information, and one or more suitable output devices, such as a computer display, output port, speaker, or other device for conveying information including digital data, visual information, or audio information.

Graphical user interface 12 may comprise an agent area 14 which is dedicated to the activities of creating new agents and manipulating existing agents, as described herein. For example, in one embodiment, an "agent" icon is added to a screen menu; the interface screen which is accessed by "clicking" on the agent icon constitutes the agent area.

Voice User Interface

A voice user interface (VUI) 16 allows a user to interact with network system 2 via a telephone line, which can be an analog telephone line, a digital T1 line, a digital T3 line, or an OC3 telephony feed. In contrast to graphical user interface 12, voice user interface 16 does not require that a user have access to an electronic interface, such as a computer. Rather, voice user interface 16 interprets the vocalized expressions of a user so that the user may issue commands and other input into network system 2. Voice user interface 16 may also issue audible output in the form of speech that is understandable by a user. Such speech can be synthesized or previously recorded, as described below in more detail.

Voice user interface 16 may comprise speech recognition and speech synthesis software and/or hardware stored in or implemented as a suitable memory device and run on a suitable processor. Such speech recognition software allows network system 2 to recognize vocalized speech and may include grammar software that creates or selects a speech recognition grammar for determining which speech should be recognized. Commercially available speech recognition systems with recognition grammars are provided by ASR (Automatic Speech Recognition) technology vendors such as the following: Nuance Corporation of Menlo Park, Calif.; Dragon Systems of Newton, Mass.; IBM of Austin, Tex.; Kurzweil Applied Intelligence of Waltham, Mass.; Lernout Hauspie Speech Products of Burlington, Mass.; and PureSpeech, Inc. of Cambridge, Mass. Recognition grammars are written specifying what sentences and phrases are to be recognized by the voice user interface 16. For example, a recognition grammar can be generated by a computer scientist or a computational linguist or a linguist. The speech synthesis software synthesizes human speech and may include speech markup software for determining the speech to be synthesized.

In addition to speech synthesis software and/or hardware, voice user interface 16 may include speech play-back capabilities for playing back previously recorded human speech. Exemplary play-back devices include a tape player, a laser disc player, etc. Here, an actual person (preferably an actor) recites various statements which may desirably be issued during an interactive session with a user of network system 2. The person's voice is recorded as the recitations are made. The recordings are separated into discrete messages, each message comprising one or more statements that would desirably be issued in a particular context (e.g., greeting, farewell, requesting instructions, receiving instructions, etc.). Afterwards, when a user interacts with network system 2, the recorded messages are played back to the user when the proper context arises. In one embodiment, such speech play-back capabilities can be used to implement a voice user interface with personality, as taught by U.S. patent application Ser. No. 09/071,717, entitled "Voice User Interface With Personality," the text of which is incorporated herein by reference.

Voice user interface 16 may also comprise hardware and/or software supporting the interpretation and issuance of dual tone multiple frequency (DTMF) commands so that a user may alternatively interact with network system 2 using a telephone key pad.

Voice user interface 16 may comprise an agent area 18 which, like agent area 14 of graphical user interface 12, is dedicated to the activities of creating new agents and manipulating existing agents. In one embodiment, agent area 18 of voice user interface 16 can be implemented by translating the agent area 14 of graphical user interface 12 into voice.

Agent Server

Programmable functionality component 4 includes an agent server 20. Agent server 20 is in communication with graphical user interface 12 and voice user interface 16, and accordingly, may exchange (receive and transmit) information therewith. In general, agent server 20 controls, coordinates, and otherwise manages the overall operation of programmable functionality component 4. Among other things, agent server 20 may invoke, initiate, or execute various routines, processes, objects, and the like. For example, when a user wishes to interact with network system 2 via graphical user interface 12, agent server 20 may cause web pages to be downloaded to an electronic user device. As another example, agent server 20 may prompt voice user interface 16 to issue various statements at appropriate moments during an interactive session with a user via telephone. Additional functionality of agent server 20 includes, but is not limited to, executing agent objects, identifying computational and service permissions, and controlling the consumption of computational and service resources, as described below in more detail.

Agent server 20 is responsive to various commands which it may receive from a user, for example, via graphical user interface 12 or voice user interface 16. These commands can be of three types: agent commands, agent template commands, and selection commands for selecting agents and agent templates. Each of these types of commands is explained below in more detail. Agent server 20 executes these commands during its operation.

The functionality of agent server 20 can be performed by any suitable processor such as a mainframe, file server, workstation, or other suitable data processing facility running appropriate software. Agent server 20 may operate under the control of any suitable operating system such as MS-DOS, MacINTOSH OS, WINDOWS NT, WINDOWS 95, OS/2, UNIX, XENIX, GEOS, MAGIC CAP, and the like.

Computational Resources

A number of computational resources 21 are available to agent server 20. In general, computational resources 21 are resources provided or supported by a computer-based system (FIG. 2) having one or more processors, data-storage devices, interfaces, suitable connections, etc. Computational resources 21 include processing time, memory storage space, and the like. As described herein, computational resources 21 may be "consumed" or "used up" during the operation of network system 2.

Agents

A number of agents 22 are in communication with agent server 20. Each agent 22 is associated with a particular user (e.g., a subscriber or an individual affiliated with the service provider), which may be deemed to be the "principal" for the respective agent. Generally speaking, agents 22 can be considered to be personal software assistants with authority delegated by the respective principals. That is, each agent 22 may be implemented as a software application, program, or process which autonomously, and possibly continuously, runs on behalf of its principal. As such, an agent 22 may be viewed by its principal as an electronic extension thereof. A particular principal may employ a plurality of agents 22, each of which serves only that principal.

The software applications for implementing agents 22 may each comprise a text file or document in, for example, a format prescribed by extensible Markup Language (XML). XML is a subset of Standard Generalized Markup Language (SGML) and, like SGML, is a meta-language—i.e., a language for specifying markup languages. One such markup language is Agent Definition Format (ADF) developed by General Magic, Inc. Various specifications for ADF are discussed in detail in microfiche Appendix C, in accordance with an embodiment of the present invention. A markup language such as ADF uses tags to provide programming language constructs to text. These tags, which may comprise instructions enclosed in angled brackets, are inserted before and after the text affected. Agent server 20 can interpret the tags and text of an ADF document to cause a respective agent 22 to act. Exemplary code for a number of agents 22 is provided in microfiche Appendix D, in accordance with an embodiment of the present invention.

Agents 22 are task-based. That is, each agent 22 is responsible for performing a particular task or set of tasks on behalf of the respective principal. These tasks may include, for example, answering telephone calls, taking voice mail messages, placing telephone calls, notifying the user of recently received messages (voice mail and/or e-mail), delivering messages, setting up meetings/appointments, gathering information, negotiating deals, transacting electronic commerce, etc.

Agents 22 can be "standard" or "customized." A standard agent is one which may be written and/or set-up by the service provider. In general, standard agents perform tasks that many users (e.g., subscribers) each would desirably have performed on his or her behalf. Such tasks may include organizing meetings and delivering messages. A separate copy of a standard agent may be engaged or selected by each user who wishes to have the respective tasks performed. Thus, many standard agents, each performing the same sort of tasks but for different users, may exist in network system 2.

In contrast, a customized agent is one which is written and/or set up by a particular subscriber or group of subscribers to perform certain tasks which are unique to that subscriber or group. For example, a particular subscriber or group may work in the real estate industry and thus desire to have certain tasks related to real estate transactions performed for him/her or them. In this case, such subscriber or group of subscribers may customize or create one or more agents that address the specialized needs of the subscriber or group. Furthermore, a third party may customize or create agents for subscribers or groups which are unable, unwilling, or lack the sophistication to do so for themselves. Such agents customized by a third party can be made commercially available to subscribers and other users. Accordingly, network system 2 is extensible in the sense that subscribers and/or third parties may program customized agents 22 according to particular needs.

The customization of agents 22 can be accomplished using an electronic user device (e.g., desktop computer) communicating with network system 2 via graphical user interface 12. In one embodiment, the service provider may maintain a website which users can access for customizing agents 22.

While performing the respective tasks, agents 22 may use or consume various computational resources 21 (e.g., memory storage space, processing time, and the like). Furthermore, agents 22 may also use or consume various service resources (described below in more detail) during the performance of their respective tasks. The consumption of computational and service resources by various agents 22 can be monitored, and the respective principals charged for the same.

In one embodiment, each agent 22 is given permission to consume up to a pre-authorized amount of each computational resource and each service resource that the agent may use when performing its respective task(s). For each computational resource, the relevant permission constitutes a "computational permission." For each service resource, the relevant permission constitutes a "service permission." With respect to a particular agent 22, the computational and service permissions ensure that other agents 22 (acting on behalf of the same or other principals/users) have adequate computational and service resources, even in the case of a maliciously or incorrectly programmed customized agent.

Alternatively, a computational or a service permission may be associated with a particular principal and specifies a predetermined amount of a respective resource which is allowed to be consumed on behalf of that principal. That is, multiple agents 22 having the same principal may each use the same resource. By authorizing a predetermined amount of resource for the principal, the associated agents 22 are given a "pool" of that resource from which to draw.

In one embodiment, each agent 22 may direct its own movement (i.e., transportation) through a computer-based system (FIG. 2) by executing an instruction which identifies a destination computer within the computer-based system and directs that the particular agent 22 be transported there. While executing within the destination computer, the agent may have access to information which is not available elsewhere in the computer-based system. The particular agent can access and use that information to determine another destination computer to which the agent should travel.

Agents 22 are created from agent templates. An agent template can be a "blueprint" for one or more agents 22. In object-oriented terminology, each agent 22 is an object and each template is an agent class from which agents 22 can be created by instantiating the class/template. In one embodiment, an agent template is essentially an agent object in its initial state. After the agent has been created, it may be executed. During execution, the agent object begins to receive events, handle these events, and so change its state.

In accordance with an embodiment of the present invention, network system 2 allows users (e.g., subscribers) to create, copy, modify, edit, or delete agents 22 and the associated templates as desired, thereby affording extensibility.

Services

A number of services 24 may each comprise one or more software applications providing various capabilities that are available to a principal. Each service 24 may be utilized by one or more agents 22 in order to perform their respective tasks. For example, one service 24 may support call processing, including a voice mail system. With this service 24, an agent 22 may place an outgoing telephone call for its principal, answer an incoming telephone call for the principal, and record a voice message from a caller. Another exemplary service 24 may support an electronic mail (e-mail) system. With an e-mail service, an agent 22 may collect, forward, and store e-mail messages addressed to the respective principal, generate e-mail messages for the principal, and notify the principal when new e-mail messages have been received. Yet another exemplary service 24 may support an electronic appointment book. With this service, an agent 22 can plan a schedule, check conflicts therewith, and organize various meetings, interviews, etc. for its respective principal. Still another exemplary service 24 can support an electronic address book which maintains information about one or more contacts with whom a principal may interact. The information maintained for each of these contacts may include the contact's name, title, employer, business address, home address, e-mail address, work phone number, home phone number, and the like. Still yet another service 24 can support on-line data retrieval for various information. With this service, an agent 22 can retrieve electronic copies of periodicals (e.g., newspapers, magazines, etc.) and the latest quotes for stocks, bonds, mutual funds, etc. In order to use a particular service 24, an agent 22 must first be authorized to do so. This authority may be given by the service provider and/or the respective principal.

In one embodiment, a plurality of services 24 may be used by a particular agent 22 which acts as a "virtual assistant" for its respective principal. This virtual assistant may, for example, answer an incoming telephone call, identify the caller, schedule a meeting between the caller and the principal, and generate an e-mail message notifying the principal of such meeting. Additional services 24 can be used (by this agent 22) by extending or customizing the agent, as described herein.

Service Resources

One or more service resources 25 can support each service 24. In one embodiment, at least a portion of service resources 25 can be integral to the respective services 24. In general, a service resource 25 is a resource which enables a service to be performed. For example, for a call processing service, service resources 25 may include a telephone, an answering machine, a telephone line, a local telephone provider service, a long-distance telephone provider service, etc. As another example, for an on-line data retrieval service, service resources 25 may include a telephony connection, a modem for on-line communication, an on-line database provider service, etc. As yet another example, for an e-mail service, service resources 25 may include an Internet connection and disk space for storing e-mail messages.

At least some of service resources 25 may comprise discrete units which are "consumed" during utilization of the respective resource by an agent 22. For example, a service resource 25 related to telephony services (e.g., voice mail and call placement) may comprise units of long-distance calling time which are consumed as an agent 22 places one or more calls utilizing such services 24. Likewise, a service resource 25 related to on-line data retrieval may comprise units of data-access time or inquiry which are consumed as an agent retrieves data (e.g., stock quotes, newspaper articles, etc.) utilizing the respective service 24.

Service Wrappers

A number of service wrappers 26 link services 24 and respective service resources 25 to agent server 20. In the depicted embodiment, a separate service wrapper 26 is provided for each service 24. Each service wrapper 26 can mediate the interaction between a service 24 (and its respective resources 25) and the remainder of programmable functionality component 4. In one embodiment, at least a portion of service wrappers 26 can be integral to the respective services 24 and/or service resources 25. Service wrappers 26, in conjunction with agent server 20, may act as "gatekeepers" to the respective services 24. That is, a service wrapper 26 grants access, to a respective service 24, only to agents 22 which have been authorized to utilize such service. For example, a voice message held by a service 24 supporting voice mail is accessible only by an agent 22 which has authority from the user for whom the message was left. Similarly, for a service 24 supporting call answering, the respective service wrapper 26 only allows agents 22 having authority from a particular user to answer telephone calls placed to a number associated with such a user.

Service wrappers 26 enable communication between services 24 and agent server 20, for example, by converting between a computer language (or instruction set) used within agent server 20 and the computer language (or instruction set) of the respective service 24. For this purpose, in one embodiment, each service wrapper 26 may be implemented, at least in part, with an application programming interface (API). An API allows access to the respective service 24, thereby pragmatically exposing the capabilities of the service 24 to one or more agents 22. That is, each service wrapper 26 lets any agent (having the proper authorization) use the respective service 24. A service wrapper 26 may also allow agent server 20 to replace one service 24 with another service 24 of the same type, but located on a different computer, without any interruption to principals. This operation of a service wrapper 26 is hidden or invisible to users, and thus, service wrappers 26 provide a point of abstraction between the respective service 24 and agent server 20.

Furthermore, at least some of service wrappers 26 may monitor the amount of service resources 25 expended or otherwise consumed by one or more authorized agents 22 when utilizing the respective service 24. For example, a service wrapper 26 may identify the respective service resource 25 to agent server 20, allow agent server 20 to impose a predetermined limit on each authorized agent's use of such service resource 25 (i.e., allocate a predetermined amount of service resource 25 for each agent), and debit/credit the amount consumed from the predetermined amount previously allocated for the agent 22. Thus, each service wrapper 26, in conjunction with agent server 20, controls an agent's consumption of service resources 25, thereby ensuring that an agent 22 does not use more than a predetermined amount of resource when performing its respective task or tasks. In this way, service wrappers 26 protect against the over-consumption, whether international or inadvertent, of the respective service resources 25. A service wrapper 26 thus serves to ensure that sufficient units of a service resource 25 are available for each agent 22 authorized to utilize the respective service 24. In addition, a service wrapper 26 may maintain a record of the amount of service resource 25 consumed by various agents 22 so that the appropriate users/principals can be billed accordingly.

Operational Overview

In operation, one or more agents 22 may be set up for each user who is a subscriber to the services offered by the operator/provider of network system 2. These agents 22 can be standard (i.e., set up by the service provider) or customized (i.e., set up by the respective user). Each agent for a particular user performs one or more tasks on behalf of that user. These tasks may include answering calls, taking voice mail messages, placing calls, notifying the user of recently received e-mail, setting up appointments, negotiating deals, transacting electronic commerce, etc. To perform these tasks, each agent 22 utilizes one or more services 24, during which it may consume various respective service resources 25. Access to each service 24 is granted by the respective service wrapper 26, which may also monitor the amount of each respective service resource 25 consumed to ensure that no particular agent 22 uses more than an amount authorized for that agent when performing its specific task(s). This protects both the authorizing user/subscriber and the service provider against undue consumption of service resources 25. Via a suitable interface (e.g., graphical user interface 12 or voice user interface 16), a user may direct, command, instruct, or otherwise communicate with each of his or her respective agents 22. At any time, a user can extend the services provided thereto by customizing existing agents 22, or alternatively, employing (and possibly customizing additional) agents 22.

In this manner, the present invention enables subscribers of a network service provided by network system 2 to create and employ personal agents 22 utilizing services 24 in a manner that is safe and secure for the subscribers and the service provider.

Computer-Based System Implementation

Figure 2:
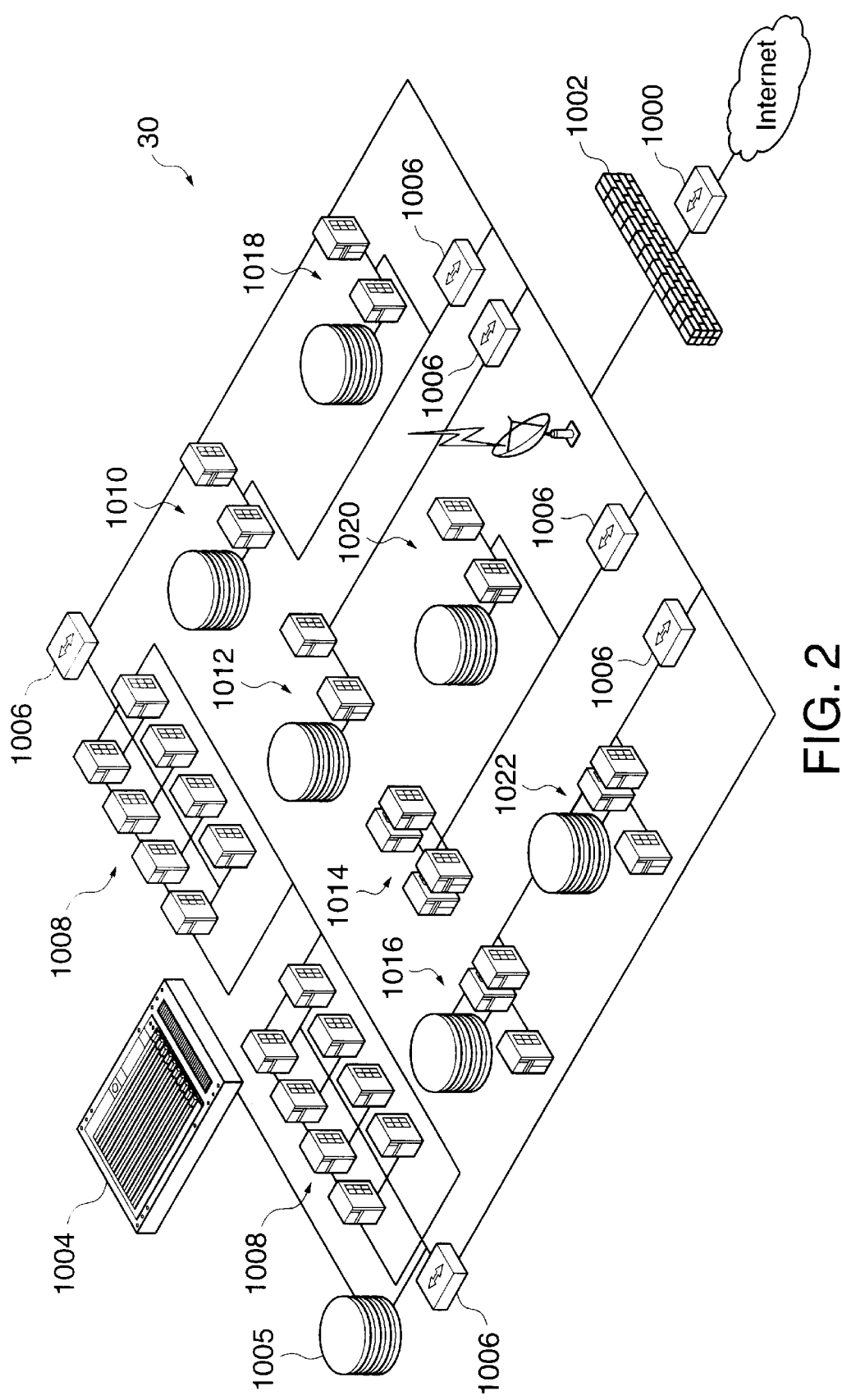
FIG. 2 illustrates an exemplary computer-based system that can be used to implement the network system shown in FIG. 1.

FIG. 2 is a simplified diagram of an exemplary computer-based system 30 that can be used to implement network system 2 shown in FIG. 1. Referring to the embodiment shown in FIG. 2, computer-based system 30 can include a communications hub 1000 and a firewall 1002 which support an interface between computer-based system 30 and the Internet. Collectively, communications hub 1000 and firewall 1002 provide communication, protection, and security between the remainder of computer-based system 30 and the Internet. Hub 1000 and firewall 1002 allow users to interact with computer-based system 30 using an electronic user device, which may support a graphical user interface 12 (FIG. 1).

A switch 1004 enables communication with computer-based system 30 via a telephone instrument. Switch 1004 allows users to interact with computer-based system 30, for example, via a voice user interface 16 (FIG. 1). A call detail records data base 1005 is coupled to switch 1004. This data base 1005 stores information relating to calls received by or initiated out of computer-based system 30. For each call, such call-related information may specify calling party, called party, telephone number of outside party, date of call, time of call, duration of call, cost of call, and the like.

A plurality of fast Ethernet hubs 1006 are coupled to firewall 1002 and switch 1004. Fast Ethernet hubs 1006 support a local area network (LAN) for computer-based system 30 and enable the routing of information signals therein. These Ethernet hubs 1006 may implement the Fast Ethernet technique in which information is transferred at a rate of 100 Mbps.

One or more application server clusters 1008 are coupled to fast Ethernet hubs 1006. Each application server cluster 1008 may comprise a plurality of servers which provide processing capability to support various functions, such as, for example, speech recognition, speech synthesis, pronunciation generation, speech playback, etc. As such, application server clusters 1008 may support a voice user interface 16 (FIG. 1).

A number of sub-systems 1010, 1012, 1014, 1016, 1018, 1020, 1022 are also coupled to fast Ethernet hubs 1006. Each of these sub-systems may comprise one or more servers, data storage devices, and other hardware components. The servers provide processing capability, and the data storage devices provide data storage capability.

At least a portion of the sub-systems in computer-based system 30 may support one or more services 24, and the respective service wrappers 26 and service resources 25 (FIG. 1). For example, as shown in FIG. 2, sub-systems 1010, 1012, 1014, 1016, and 1018 support an e-mail service, a voice mail service, a paging/facsimile service, an address book and calendar service, and a business news and stocks information service, respectively.

The remaining sub-systems support other operational aspects of computer-based system 30. In particular, as shown, sub-system 1020 maintains profiles for one or more subscribers to a network system 2. For each subscriber, a profile may include the name of the subscriber, the home address of the subscriber, the billing address of the subscriber, an e-mail address, a telephone number, a listing of all agents operating for the subscriber, the computational and service permissions granted to the subscriber's agents, and the like. Sub-system 1022 maintains various rules for the operation of network system 2. For example, such rules may govern how network system 2 processes incoming e-mail messages for particular subscribers (e.g., a subscriber may be paged upon the delivery of messages satisfying certain criteria).

Each of the servers within application server clusters 1008 and sub-systems 1010–1022 can be implemented using any of a number of server hardware configurations running a suitable server operating system, such as SUN SOLARIS, WINDOWS NT, OS/2 WARP, and NETWARE. Each data storage device within application server clusters 1008 and sub-systems 1010–1022 can be a mass storage subsystem of tapes or disk drives, which is electronically coupled to respective servers. Information or data supporting each of graphical user interface 12, voice user interface 16, agent server 20, agents 22, services 24, service resources 25, and service wrappers 26 (shown in FIG. 1) can be contained in the data storage devices. The servers may retrieve, process, and store this information into the data storage devices.

In one embodiment, as shown, application server clusters 1008 and sub-systems 1010–1022 are linked by the same LAN. In another embodiment, at least a portion of application server clusters 1008 and/or sub-systems 1010–1022 can be remote from the remainder and linked as a wide area network (WAN); consequently, computer-based system 30 may provide a distributed network.

Any one or a combination of interested parties (e.g., subscribers, third parties, or service providers) can use computer-based system 30 to collect, maintain, generate, or process the information supporting graphical user interface 12, voice user interface 16, agent server 20, computational resources 21, agents 22, services 24, service resources 25, and service wrappers 26. Any of the servers or other computers in application server clusters 1008 and sub-systems 1010–1022, either individually or in combination, can perform the functionality of agent server 20 shown in FIG. 1. Furthermore, because these servers and other computers are linked together, each can directly access (e.g., store and retrieve) any of the information described above, if necessary.

In one embodiment, agents 22 may travel throughout the environment of computer-based system 30. That is, each agent 22 may move to the servers and other computers in application server clusters 1008 and sub-systems 1010–1022, and afterward, execute thereon. As an agent 22 moves and executes, it may perform its respective tasks on behalf of its principal.

The elements of computer-based system 30, and the functions provided thereby, constitute computational resources 21 which may be expended, consumed, or used during the operation of network system 2 (FIG. 1). In one embodiment, the consumption of these computational resources 21 by different agents 22 is monitored so that no particular agent 22 utilizes more than a proportionate, predetermined, or allotted share thereof, as such agent executes.

Graphical User Interface (Details)

Figure 3:
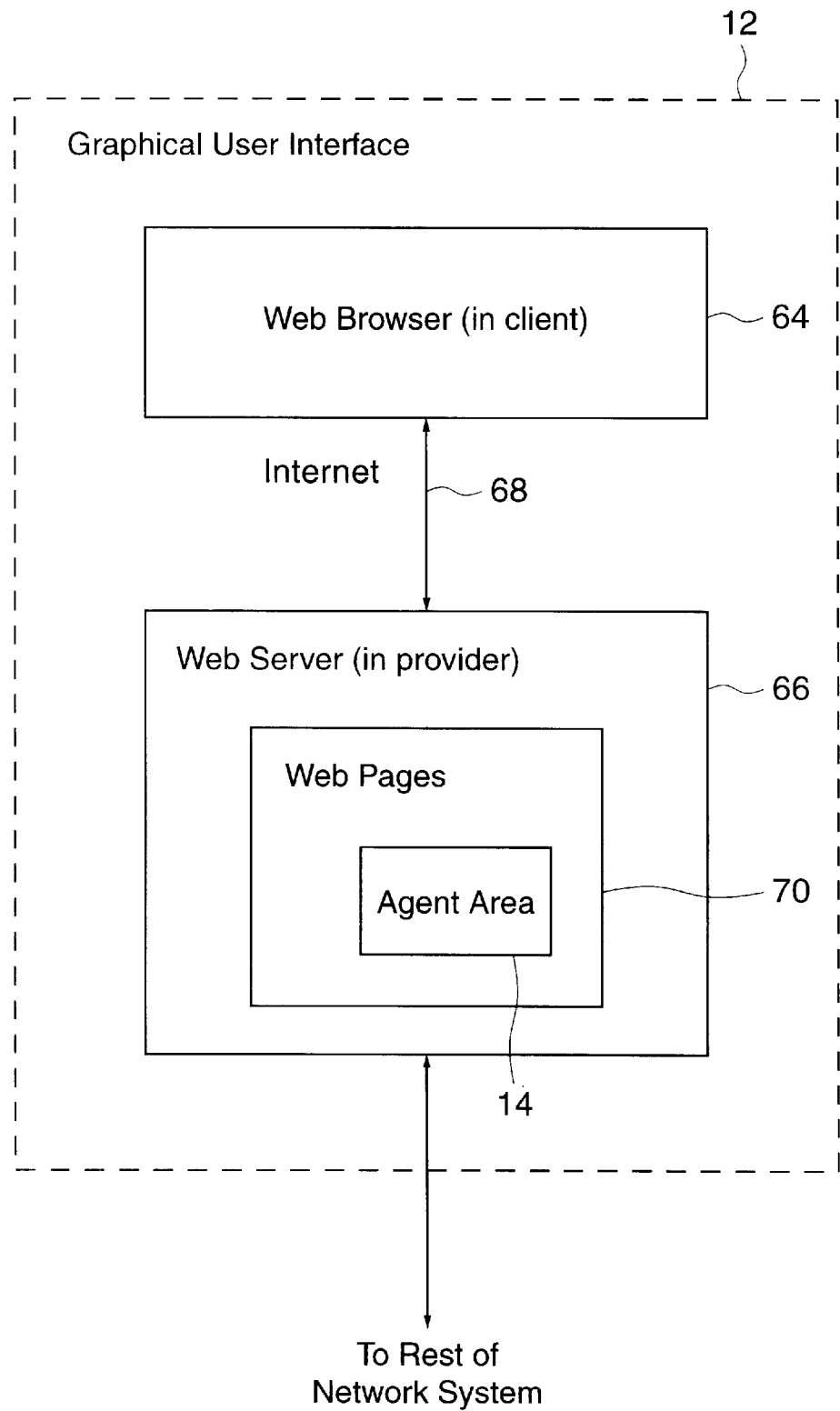
FIG. 3 illustrates details for a graphical user interface, according to an embodiment of the present invention.

FIG. 3 illustrates details for a graphical user interface 12, according to an embodiment of the present invention. As depicted, graphical user interface 12 comprises a web browser 64 and a web server 66 which are connected via a line 68 supporting Internet communication.

Web browser 64 is a client application that may reside on (or is downloaded to) a client device such as a desktop computer. Such desktop computer preferably has at least a "486" processor or an operational equivalent and runs a suitable desktop operating system, such as, for example, MS-DOS, MacINTOSH OS, WINDOWS NT, WINDOWS 95, OS/2, UNIX, XENIX, GEOS, or MAGIC CAP.

Web server 66 is a server application that resides on a service provider device, such as a server. Such server can be any of the servers in application server clusters 1008 or sub-systems 1010–1022 of computer-based system 30 shown in FIG. 2. Web server 66 may support a number of web pages 70 which can be downloaded from web server 66 to web browser 64 as appropriate during operation. At least one of these web pages 70 may constitute an agent area 14 which is dedicated to the activities of creating new agents and manipulating existing agents.

Communication line 68 can be any link capable of supporting data transfer between a client device and a service provider device. For example, communication line 68 may include any combination of an Integrated Services Digital Network ("ISDN") communication line, a hard-wired line, or a telephone line. This enables communication via the Internet, using any suitable protocol, such as, Transmission Control Protocol/Internet Protocol (TCP/IP), Internetwork Packet eXchange/Sequence Packet exchange (IPX/SPX), or AppleTalk.

Voice User Interface (Details)

Figure 4:
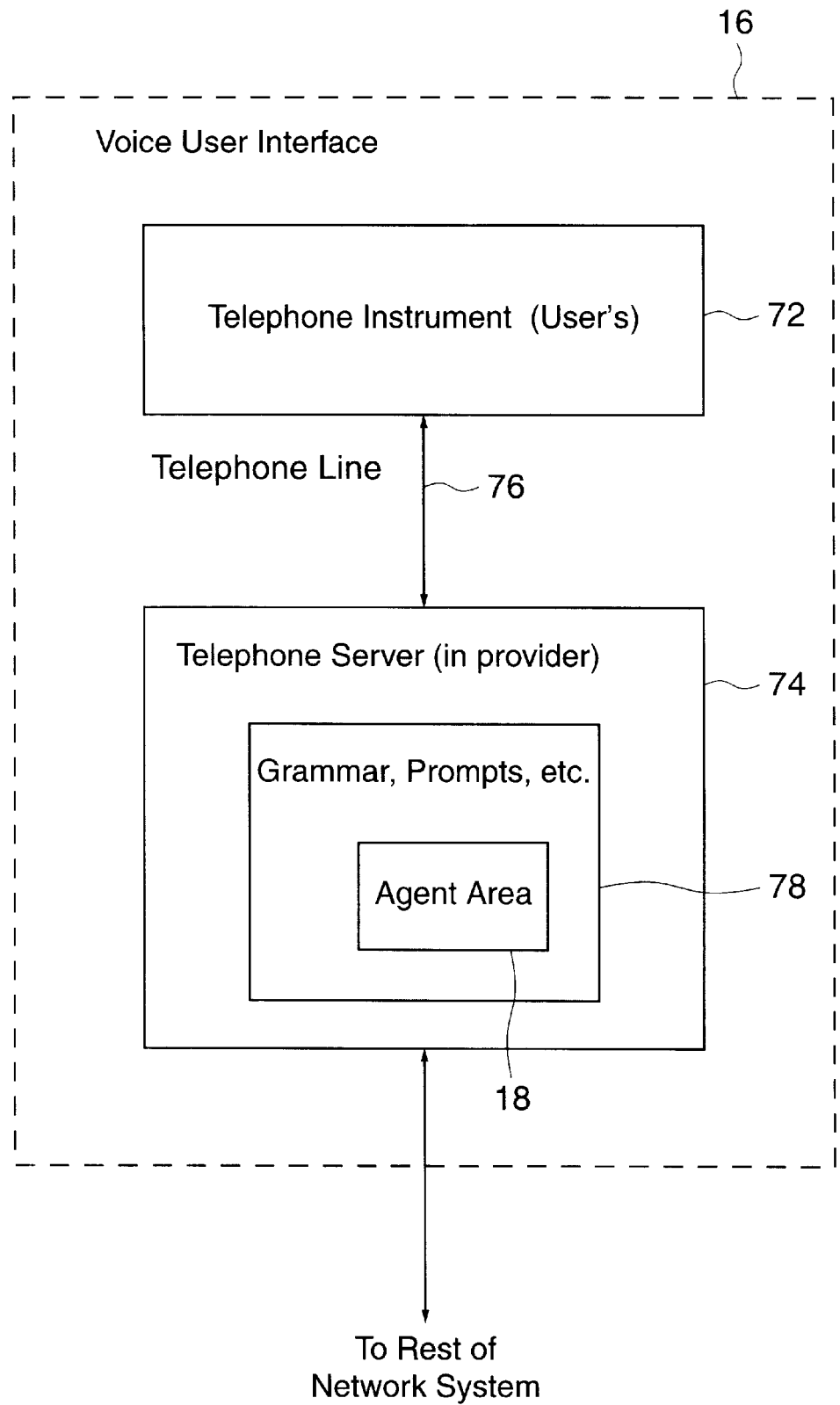
FIG. 4 illustrates details for a voice user interface, according to an embodiment of the present invention.

FIG. 4 illustrates details for a voice user interface 16, according to an embodiment of the present invention. As shown, voice user interface 16 comprises a telephone instrument 72 coupled to a telephone server 74 via a telephone line 76.

Telephone instrument 72 is a user (e.g., subscriber) device which may comprise a conventional telephone. Telephone instrument 72 may include a key pad for entering dual tone multiple frequency (DTMF) commands.

Telephone server 74 is a service provider device. Such device may comprise any of the servers in application server clusters 1008 or sub-systems 1010–1022 of computer-based system 30 shown in FIG. 2. Telephone server 74 may support a number of grammars, prompts, and other speech functionalities 78 for enabling communication with a user. At least one of these speech functionalities 78 may constitute an agent area 18 which is dedicated to the activities of creating new agents and manipulating existing agents 22.

Telephone line 76 can be an analog telephone line, a digital T1 line, a digital T3 line, or an OC3 telephony feed.

Agent Server (Details)

Figure 5:
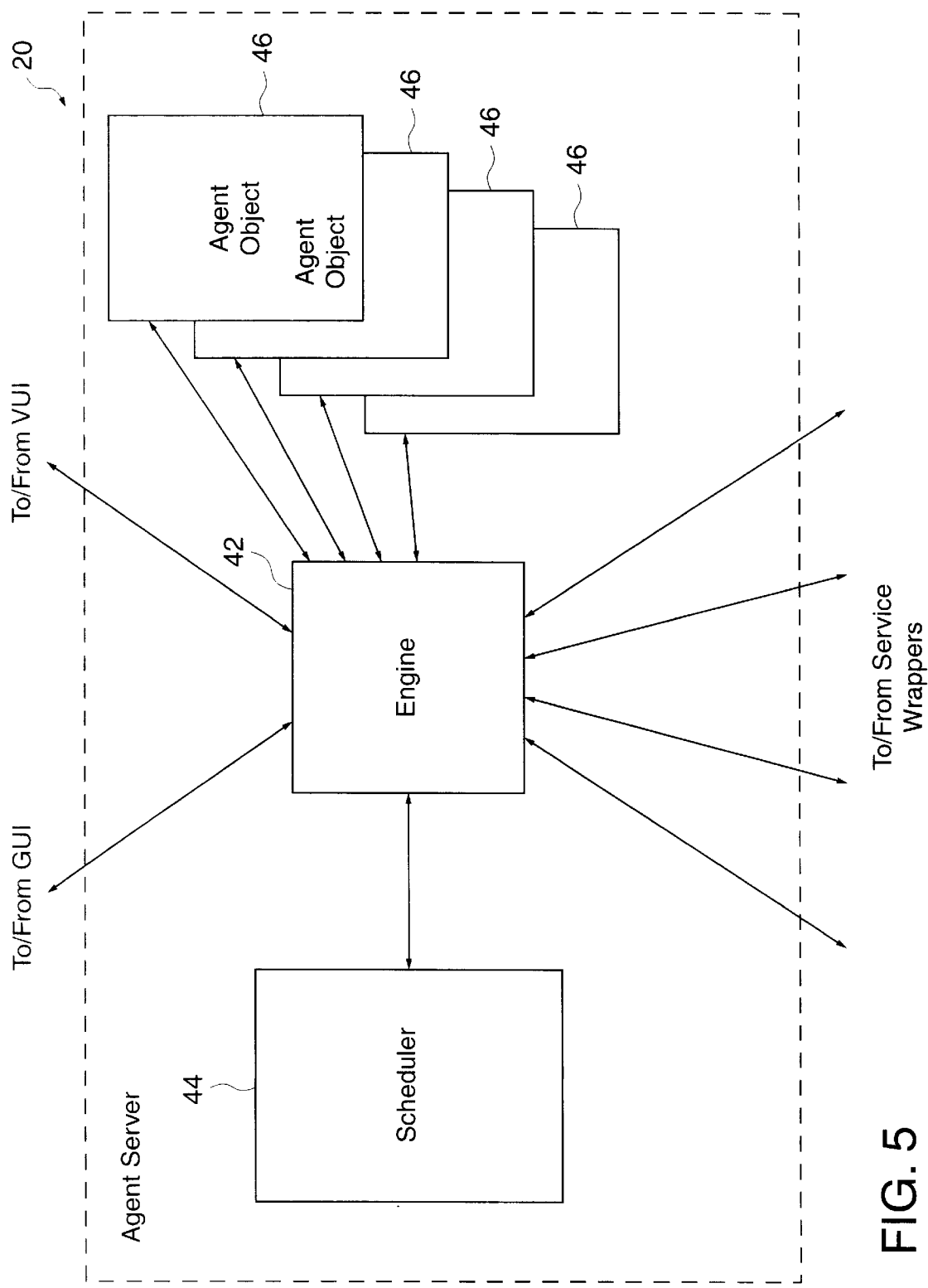
FIG. 5 illustrates details for an agent server, according to an embodiment of the present invention.

FIG. 5 illustrates details for agent server 20, in accordance with a preferred embodiment. Agent server 20 generally functions to control, coordinate, and otherwise manage the overall operation of programmable functionality component 4. This includes the use of network system 2 by agents 22. As depicted, agent server 20 includes an engine 42, a scheduler 44, and one or more agent objects 46.

Scheduler 44 maintains an internal clock, which can keep track of real time or elapsed time. In one embodiment, scheduler 44 may be supported with a piezo-electric crystal or oscillating circuit implemented with transistors. Scheduler 44 generally functions to trigger the further execution of particular agents 22 by engine 42 upon the occurrence of certain events. Such events may include the lapse of a predetermined amount of time (e.g., 24 hours) or the occurrence of a specified time (e.g., 6:00 a.m.). Scheduler 44 may maintain a record or schedule with a separate entry for each triggering event. Scheduler 44 may also receive information from engine 42. This received information may be used to create new entries within scheduler 44.

Agent objects 46 each correspond to a particular agent 22 of network system 2 (FIG. 1). Each agent object 46 can be an internal representation within agent server 20 for the corresponding agent 22. Agent objects 46 comprise software objects, each of which, in general, has (i) an internal state defined by a number of properties, (ii) an internal behavior defined by a number of methods, and (iii) an external behavior defined by a number of features.

More simply, each agent object 46 is an organization of data and instructions which are executable within agent server 20. In one embodiment, the data represents a "state" of the agent object and the instructions are grouped into tasks that are to be performed. The data may specify the corresponding agent 22, the services 24 which may be utilized by the agent, and the computational and service permissions which have been granted to the agent 22. The instructions may comprise one or more event handlers which direct the corresponding agent 22 upon the occurrence of predefined events. Each agent object 46 may also comprise a pending event queue which queues events to which the agent 22 should, but has not yet, responded.

Engine 42 is in communication with scheduler 44 and agent objects 46. In addition, engine 42 is in bi-directional communication with graphical user interface 12, voice user interface 16, and service wrappers 26. Engine 42 generally controls and/or manages the operation of agent server 20. Engine 42 may be implemented as a computer process, executing within a computer system, which invokes or manages other processes or routines, and executes instructions. For example, engine 42 can execute each agent object 46 which, in turn, may provide instructions to engine 42. Engine 42 may function to identify each of the computational permissions and service permissions specified within an agent object 46 and to control the consumption, by the corresponding agent 22, of the relevant computational resources 21 and service resources 25. Also, engine 42 may invoke routines in each of interfaces 12 and 16 and service wrappers 26. Furthermore, engine 42 may receive and be responsive to information from the same.

In one embodiment, scheduler 44 may be considered to "create" pending events to which engine 42 responds by executing an agent's handler for such event. This is described below in more detail.

In an exemplary operation for agent server 20, one agent object 46 may correspond to an agent 22 which is responsible for waking up its principal at a certain time each weekday morning. This time constitutes an event for which scheduler 44 may contain an entry. Each weekday, at the appointed time or shortly before, scheduler 44 invokes engine 42. In response engine 42 executes the particular agent object 46. When this agent object 46 is executed, the corresponding agent 22 (using the appropriate services 24) performs the task of waking up the principal, for example, by calling the principal over a telephone or, alternatively, generating an audible alarm on an electronic user device (e.g., a desktop computer).

Service Wrapper (Details)

Figure 6:
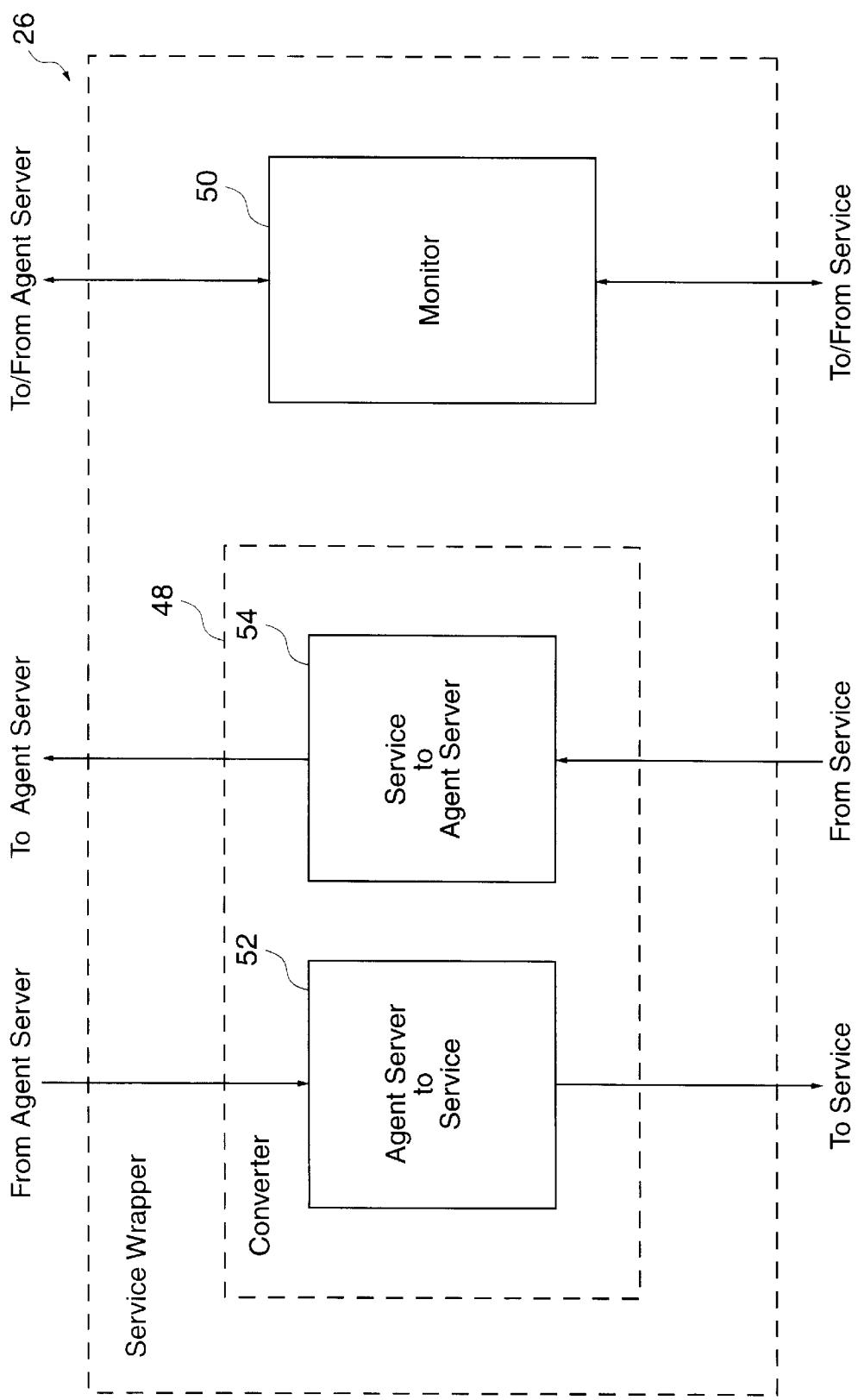
FIG. 6 illustrates details for a service wrapper, according to an embodiment of the present invention.

FIG. 6 illustrates details for a service wrapper 26, in accordance with a preferred embodiment. A service wrapper 26 generally functions to mediate the interaction between a respective service 24 and the remainder of programmable functionality component 4. In one embodiment, service wrapper 26 is associated with, and supports, only a single service 24. As shown, service wrapper 26 comprises a converter 48 and a monitor 50.

Converter 48 generally functions to convert between a computer language (or instruction set) used within agent server 20 and a computer language (or instruction set) used within the respective service 24. In one embodiment, the computer language of agent server 20 can be a high-level language, whereas the computer language of service 24 may be a low-level language. An agent 22 may comprise instructions of the set used in agent server 20; a service 24 may comprise or issue instructions of the set used therein.

As depicted, converter 48 comprises an agent-server-to-service converter 52 and a service-to-agent-server converter 54. Agent-server-to-service converter 52 operates unidirectionally to convert from the language (e.g., a high-level language) used by agent server 20 to the language (e.g., a low-level language) used by the corresponding service 24. Service-to-agent-server converter 54 also operates unidirectionally, but in contrast to converter 52, converts from the language (e.g., low-level language) used by service 24 into the language (e.g., high-level language) used by agent server 20.

Monitor 50 is coupled by bi-directional lines to each of agent server 20 and the respective service 24. Monitor 50 generally functions to monitor the amount of respective service resources 25 expended, used, or otherwise consumed by one or more agents 22 which have been authorized to access the service 24. Monitor 50 identifies respective service resources 25 to agent server 20, allows agent server 20 to impose a predetermined limit on each authorized agent's use of the respective service resources 25, and informs agent server 20 of the amount consumed against the predetermined limit. The predetermined limit may be derived from a service permission for the respective agent 22.

Exemplary Service Wrappers, Services, and Service Resources (Details)

Figure 7:
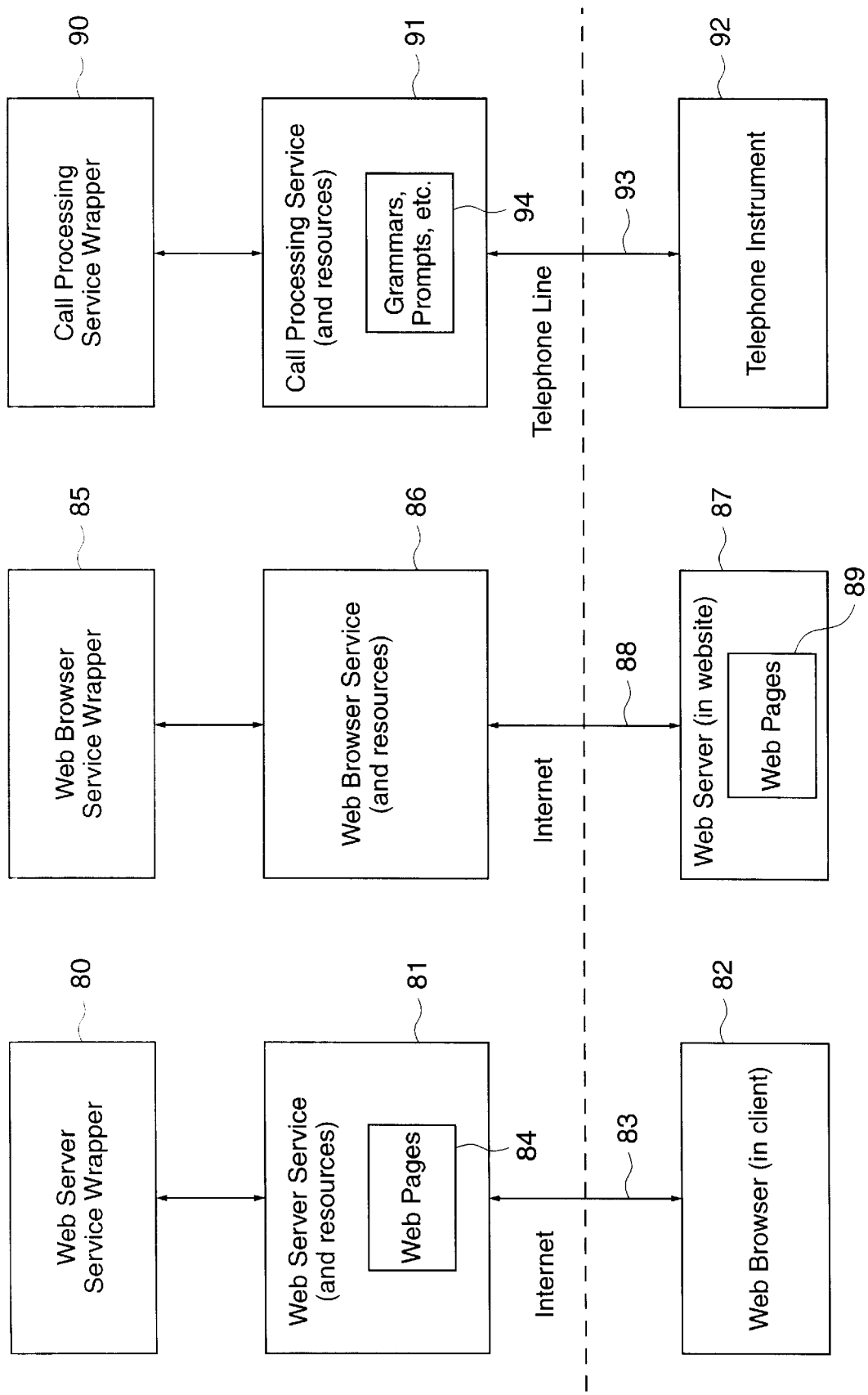
FIG. 7 illustrates details for specific exemplary service wrappers, services, and service resources.

FIG. 7 illustrates details for specific exemplary services, and their respective service wrappers and service resources. In particular, these services include a web server service 81, a web browser service 86, and a call processing service 91. Each of exemplary services 81, 86, and 91 constitutes a user interface service; that is, these services 81, 86, and 91 each provides a user interface by which an agent 22 can interact with a subscriber or third party. In FIG. 7, the services and respective service resources have been combined because, with these examples, the services and resources are not logically distinct.

Web server service 81 provides a web server from network system 2 (FIG. 1) and can be used, for example, to notify a user about recently received e-mail messages. Web server service 81 (and its respective service resources) resides in network system 2 and includes one or more web pages 84. A web server service wrapper 80 controls access from the remainder of programmable functionality component 4 into web server service 81 and its associated service resources. A web browser 82 is connected to web server service 81 via an Internet line 83. Web browser 82 may reside in a client device. Web pages 84 can be downloaded from web server service 81 to web browser 82. Collectively, web server service 81, web pages 84, web browser 82, and Internet line 83 can implement a graphical user interface with which an agent 22 can interact with its principal or another party.

Web browser service 86 provides a web browser from network system 2 and can be used, for example, for online data access to stock quotes, news, etc. Web browser service 86 and its respective service resources are resident on network system 2. A web browser service wrapper 85 provides access from the remainder of programmable functionality component 4 into web browser service 86 and its service resources. A web server 87 is connected to web browser service 86 via an Internet line 88. Web server 87 resides in a website server device and may comprise one or more web pages 89 which can be downloaded to web browser service 86. Collectively, web browser service 86, web server 87, web pages 89, and Internet line 88 can implement a graphical user interface with which an agent 22 can interact with an arbitrary website on behalf of its principal.

Call processing service 91 provides call processing from network system 2 and can be used, for example, to take voice mail messages for one or more subscribers. Call processing service 91 and its respective service resources reside in network system 2. Call processing service 91 may include grammars, prompts, and other speech functionality 94. A call processing service wrapper 90 controls access from the remainder of programmable functionality component 4 to call processing service 91 and its service resources. A telephone instrument 92, which resides outside of network system 2, is connected to call processing service 91 via a telephone line 93. Collectively, call processing service 91, speech functionality 94, telephone instrument 92, and telephone line 93 can implement a voice user interface with which an agent 22 can interact with its principal or another party, for example, by placing a call to, or answering a call from, the principal or other party.

Agent Object (Details)

Figure 8:
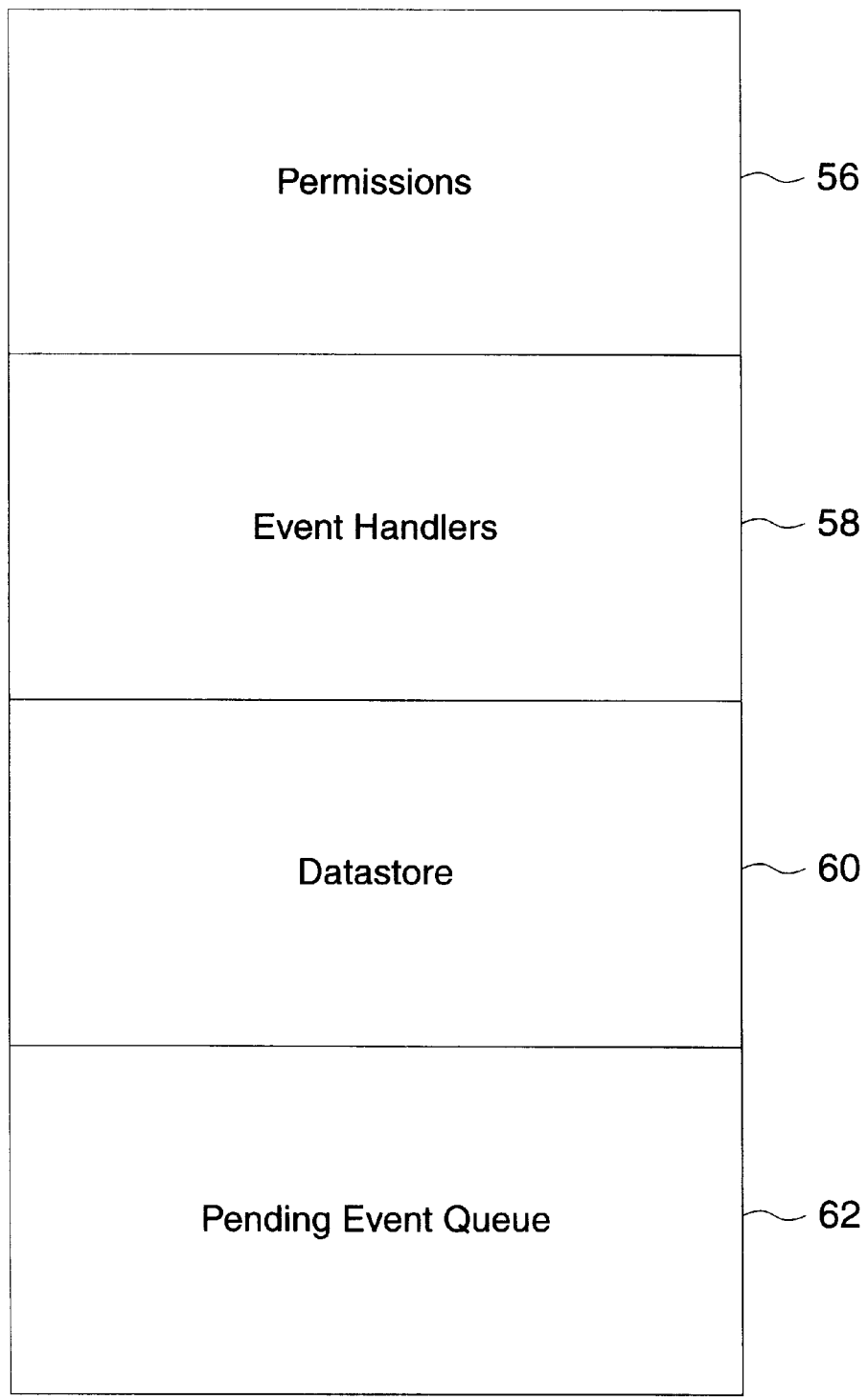
FIG. 8 illustrates details for an exemplary agent object, according to an embodiment of the present invention.

FIG. 8 illustrates details for an agent object 46, in accordance with an exemplary embodiment. An agent object 46 generally represents (within agent server 20) a corresponding agent 22, which can be considered to be a personal software assistant to a particular principal. Agent object 46 can be a software object and may reside within agent server 20. As depicted, agent object 46 comprises a permissions component 56, an event handlers component 58, a datastore component 60 and a pending event queue component 62. In other embodiments, the event handlers component and the pending event queue component may be external to an agent object 46.

Permissions component 56 generally comprises data and instructions related to permissions that have been granted to the agent 22 represented by agent object 46. These permissions include computational permissions and service permissions. A computational permission can specify that a respective agent 22 is authorized to consume a particular computational resource 21 (e.g., memory storage space, processing time, elapsed time, and the like which may be provided by the elements and functions of computer-based system 30) when performing its particular task(s). Furthermore, in some instances, a computational permission can specify a pre-authorized amount of computational resource 21 which may be allowably consumed by the respective agent 22. A service permission can specify that the respective agent is authorized to consume a particular service resource 25 (e.g., long-distance time, on-line data access time) when the agent utilizes a respective service 24 (e.g., e-mail, phone mail, electronic appointment book, electronic contact book, etc.) in performing its task(s). In some instances, a service permission can specify a pre-authorized amount of service resource 25 which is allowably consumed by the respective agent 22.

Event handlers component 58 includes data and instructions for directing agent server 20 and/or engine 42 upon the occurrence of various events which may arise during the operation of network system 2. In particular, an event handler comprises a routine for handling an event of a specified type. For example, these events can be the lapse of a previously specified amount of time or the delivery of an e-mail message.

In one embodiment, an event is identified by a uniform resource locator (URL) which expresses or provides an address for a web page. The URL specifies both the event's type and the agent 22 which is event's intended recipient. The URL may be chosen by agent server 20 and the particular agent 22 in combination. This allows a web server providing a graphical user interface to network system 10 to receive HyperText Transfer Protocol (HTTP) requests for the web page at the URL so that agent server 20 can relay the event to the particular agent 22. A standard web browser can send an event to an agent 22 by fetching the web page identified by the URL for the event. The web page returned to the browser is supplied by the agent's event handler and relayed by agent server 20. One of the instructions in an agent instruction set allows an agent 22 to send an event (for example, to another agent 22 as a means of inter-agent communication).

Datastore component 60 may contain various information related to agent object 46. This may include information specifying the corresponding agent 22, the principal or user for whom that agent 22 performs tasks, the tasks which the agent 22 may perform, etc. Datastore component 60 may also include information used by agent object 46 for guiding its interaction with various service wrappers 26. For example, datastore component 60 may contain the parameters of a request the agent intends to make of a particular service wrapper 26 or the wrapper's response to such a request.

Pending event queue component 62 comprises information for events to which the corresponding agent 22 should, but has not yet, responded. Pending event queue component 62 queues these events so that the agent 22 may respond, for example, using the event handlers specified in event handlers component 58.

User Session

Figure 9:
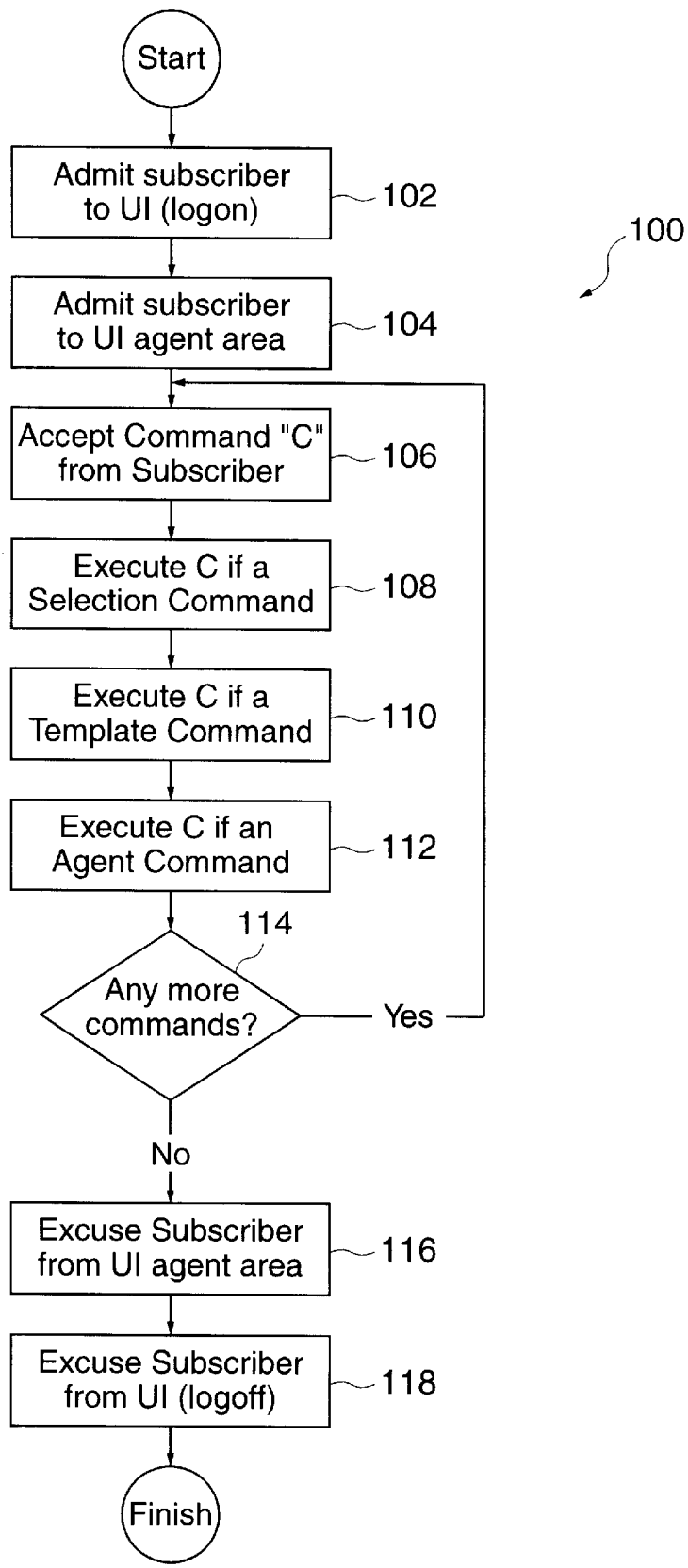
FIG. 9 is a flow diagram of an exemplary method for a user session, according to an embodiment of the present invention.

FIG. 9 is a flow diagram of an exemplary method 100 for a user session, according to an embodiment of the present invention. During method 100, a user is interacting with network system 2.

Method 100 begins at step 102 where network system 2 admits a user at a user interface (UI), which can be either graphical user interface 12 or voice user interface 16. Essentially, at this step, a user logs on to network system 2.

At step 104, network system 2 admits the user to the agent area of the relevant user interface. For voice user interface 16, this is agent area 18. For graphical user interface 12, this is agent area 14. With graphical user interface 12, a user is admitted to the agent area when the user "clicks" on an agent icon which is displayed on a menu screen. In the agent area, the user can create new agents and manipulate existing agents. Specifically, the user can enter various commands, depending on his or her intentions.

Each command can be one of three types: an agent command, a template command, or a selection command. Agent commands are directed to the running of agents. These agents include ones which are currently executing and which the user now would like to manipulate. Template commands are directed to the manipulation of agent templates. An agent template can be a "blueprint" for agents. In object-oriented terminology, each agent is an object and each template is an agent class from which agents can be created by instantiating the class/template. Selection commands select agents or templates. A selection command allows network system 2 to focus on a particular template or a particular agent in order to provide a context for any subsequent template command or agent command.

At step 106, network system 2 accepts a command which has been entered by the user via the user interface. The command is forwarded from the user interface to agent server 20.

If the command is a selection command, agent server 20 executes such command at step 108. If the command is a template command, agent server 20 executes the command at step 110. Otherwise, if the command is an agent command, agent server 20 executes the command at step 112. The executions of a selection command, a template command, and an agent command are described below in more detail.

At step 114, network system 2 prompts a user for more commands. If the user enters additional commands, method 100 returns to step 106 where the next command is accepted. Method 100 repeats steps 106–114 until no additional commands are entered.

At step 116, network system 2 excuses the user from the agent area of the user interface. At step 118, the user is excused from the user interface itself. That is, the user logs off network system 2. Afterwards, method 100 ends.

Selection Command Execution

Figure 10:
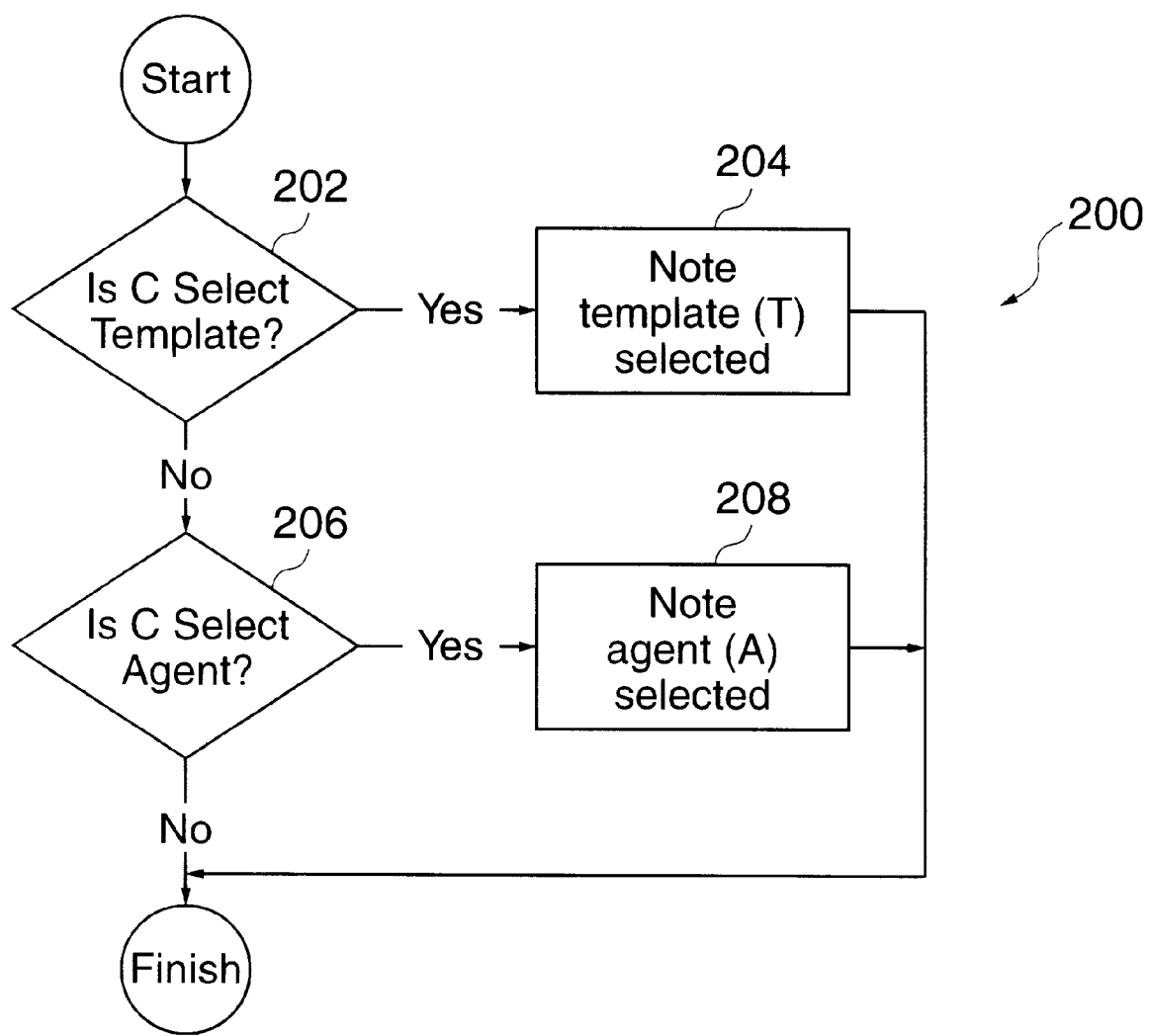
FIG. 10 is a flow diagram of an exemplary method for executing a selection command for selecting an agent or an agent template, according to an embodiment of the present invention.

FIG. 10 is a flow diagram of an exemplary method 200 for executing a selection command, according to an embodiment of the present invention. Method 200 is initiated within and performed by network system 2 when a user (e.g., subscriber) has entered a selection command. A selection command can be one of two types: a select agent command or a select template command.

A select agent command is one which selects a particular agent. Specifically, when a user enters the agent area, a list of executing agents may be visible. The user enters a select agent command to select a particular agent from the list in order to manipulate the same;.afterwards, the user can enter an agent command to perform the manipulation.

Similarly, a select template command is one which selects a particular template. In particular, a list of agent templates may be provided from which a user may select. The user enters a select template command to select a particular template from the list; afterwards, the user can enter a template command to manipulate the template.

Method 200 begins at step 202 where agent server 20 determines whether the selection command is a select template command. If the selection command is a select template command, method 200 moves to step 204 where agent server 20 notes the particular template which has been selected. Afterwards, method 200 ends.

Otherwise, if at step 202 it is determined that the selection command is not a select template command, then at step 206 agent server 20 determines whether the selection command is a select agent command. If the command is a select agent command, method 200 moves to step 208 where agent server 20 notes the agent which has been selected, after which method 200 ends.

Otherwise, if the selection command is no t a select agent command, method 200 ends.

Template Command Execution

Figure 11:
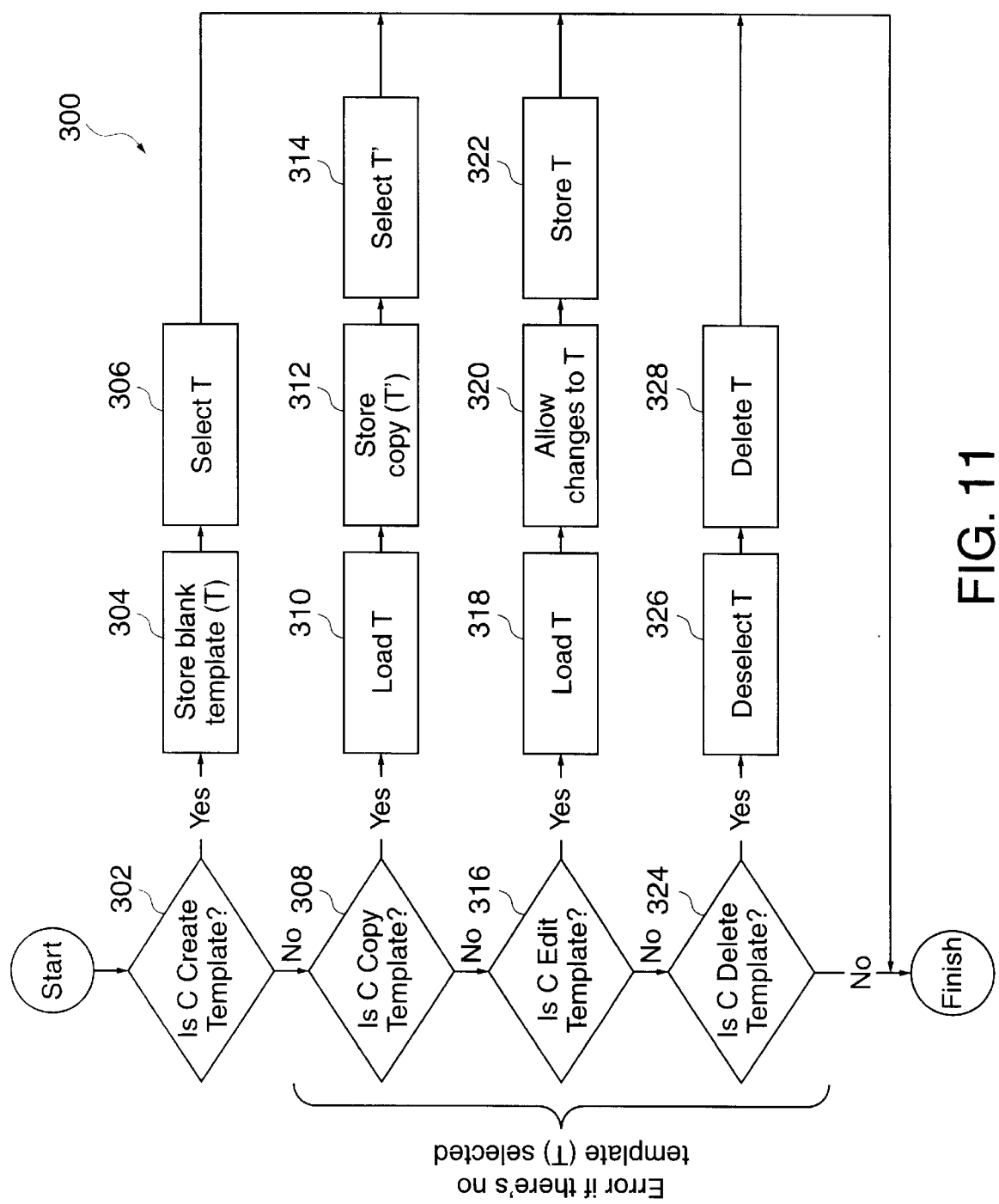
FIG. 11 is a flow diagram of an exemplary method for executing an agent template command, according to an embodiment of the present invention.

FIG. 11 is a flow diagram of an exemplary method 300 for executing a template command, according to an embodiment of the present invention. Method 300 is initiated within and performed by network system 2 when a user has entered a template command. In general, a template command is one which affects a particular template. A template command can be one of four types: a create template command, a copy template command, an edit template command, and a delete template command.

Method 300 begins at step 302 where agent server 20 determines whether the template command which has been entered is a create template command. A create template command is one which creates a new template. Each new template can be based on a generic blank template which can be modified as desired by a user.

Accordingly, if the template command is a create template command, then at step 304 agent server 20 stores a blank template into memory (a computational resource 21) where the template can be modified. In the context of a graphical user interface, an entry for the new template is added to the list of templates appearing on a screen. At step 306, agent server 20 selects the blank template as the current template, after which method 300 ends.

Referring again to step 302, if it is determined that the template command is not a create template command, than method 300 moves to step 308 where agent server 20 determines whether the command is a copy template command. A copy template command is one which copies an existing template. A user may enter this command when it is desirable to create a new template from a previously created template rather than the generic blank template.

If it is determined that the command is a copy template command, then at step 310 agent server 20 loads the previously created template. "Loading" a template means that the template is stored into memory, such as random access memory (RAM). At step 312, agent server 20 creates and stores a copy of the template into persistent memory, such as a hard drive. At step 314, agent server 20 selects the copy of the template as the current template, after which method 300 ends.

Referring again to step 308, if it is determined that the template command is not a copy template command, then method 300 moves to step 316 where agent server 20 determines whether the command is an edit template command. An edit template command is one which edits an existing template. A user may enter this command when it is desirable to edit either a newly created or previously created template.

If it is determined that the command is an edit template command, agent server 20 loads the template at step 318 and allows changes to be made to the template at step 320. At step 322, the edited template is stored back into persistent memory and then is made the current (selected) template, after which method 300 ends.

Otherwise, if it is determined at step 316 that the template command is not an edit template command, then method 300 moves to step 324 where agent server 20 determines whether the command is a delete template command. A delete template command is one which deletes an existing template. A user may enter this command to remove from permanent memory any template which is obsolete, incorrect, or otherwise undesirable.

If it is determined that the command is a delete template command, agent server 20 deselects the current template at step 326. Deselection is performed because a deleted template cannot be subsequently selected. Next, at step 328, agent server 20 deletes the template from persistent memory. In the context of a graphical user interface, this step would also remove an icon for such template from the screen. Method 300 then ends.

Referring again to step 324, if it is determined that the command is not a delete template command, method 300 ends because the command was not any of the types of commands for a template.

For each of steps 310, 318, and 326 above, if no template is currently selected, agent server 20 will generate an error message.

Method 300, as described, thus provides user extensibility for network system 2 by allowing a user to create, copy, edit, and delete agent templates as desired.

Agent Command Execution

Figure 12:
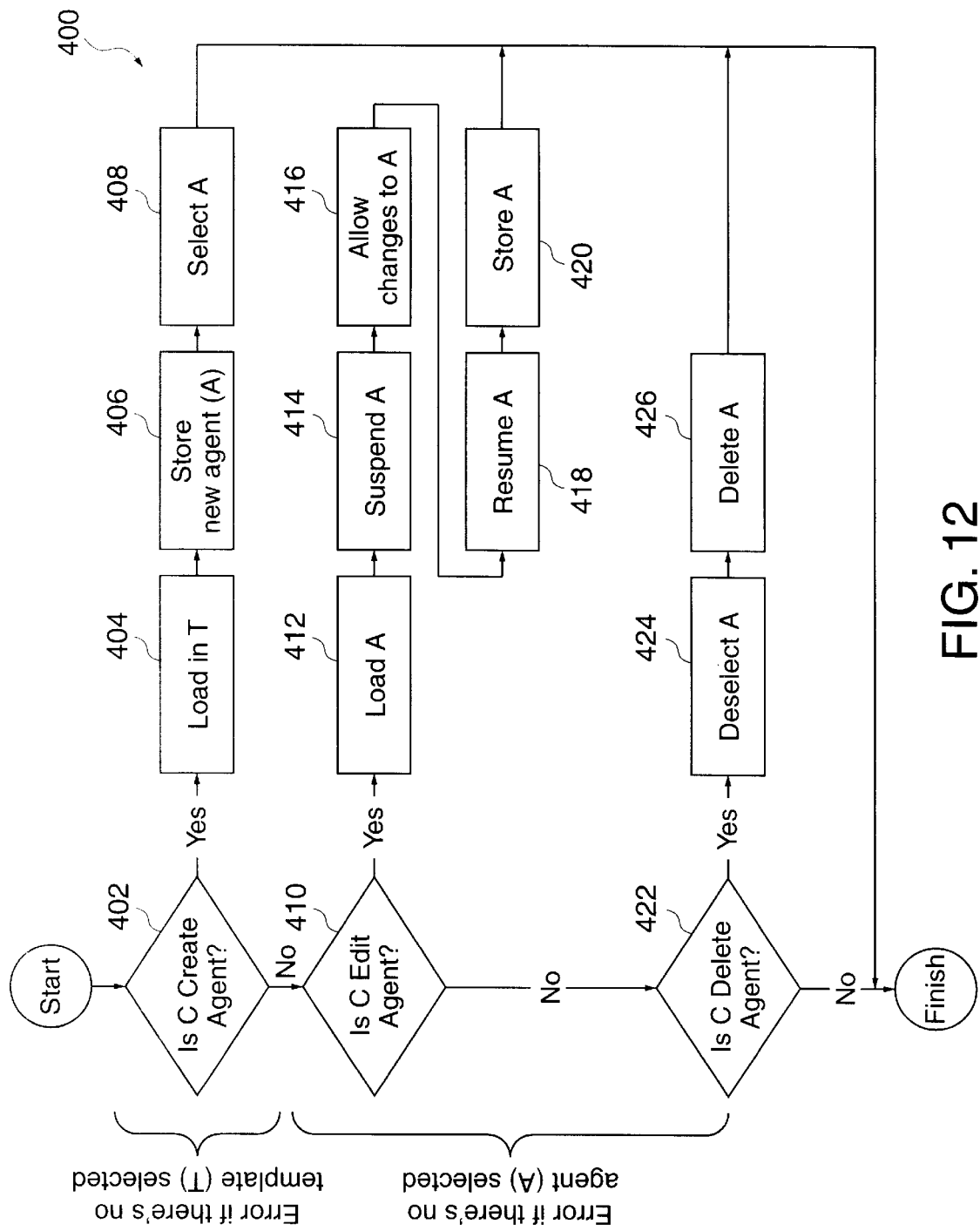
FIG. 12 is a flow diagram of an exemplary method for executing an agent command, according to an embodiment of the present invention.

FIG. 12 is a flow diagram of an exemplary method 400 for executing an agent command, according to an embodiment of the present invention. Method 400 is initiated within and performed by network system 2 when a user has entered an agent command. Generally speaking, an agent command is one which affects a particular agent 22. Agent commands can be of three types: a create agent command, an edit agent command, and a delete agent command.

Method 400 begins at step 402 where agent server 20 determines whether the command is a create agent command. A create agent command is one which creates a new agent from an agent template. After an agent 22 has been created, it is generally allowed to execute, thereby performing tasks for the user who created the agent.

If it is determined that the command is a create agent command, then at step 404 agent server 20 loads the respective agent template. If no template is currently selected, agent server 20 will generate an error message. Otherwise, at step 406, agent server 20 stores the newly created agent 22 and at step 408 selects that agent 22 as the current agent. Afterwards, method 400 ends.

With reference again to step 402, if it is determined that the command is not a create agent command, then at step 410 agent server 20 determines whether the command is an edit agent command. An edit agent command is one which allows the user to edit an executing or running agent. If no agent 22 is currently selected, however, agent server 20 generates an error message.

If it is determined that the command is an edit agent command, then agent server 20 loads the executing agent 22 at step 412. Agent server 20 suspends the execution of such agent 22 at step 414 and allows changes to be made to the agent by a user at step 416. At step 418, agent server 20 resumes the execution of the agent 22 and, at step 420, stores the edited agent. Afterwards, method 400 ends.

Referring again to step 410, if it is determined that the agent command is not an edit agent command, then at step 422 agent server 20 determines whether the command is a delete agent command. In general, a delete agent command is one which ends the execution of an agent 22 and removes it from persistent memory. If no agent 22 is currently selected, however, agent server 20 generates an error message.

If it is determined at step 422 that the command is a delete agent command, then at step 424 agent server 20 deselects the agent 22, because an agent cannot be selected once it has been deleted. At step 426, agent server 20 deletes the agent 22. Method 400 then ends.

Referring again to step 422, if it is determined that the command is not a delete agent command, method 400 ends because the command was not any of the types of commands for an agent.

Consumption of Service and Computational Resources

Figure 13:
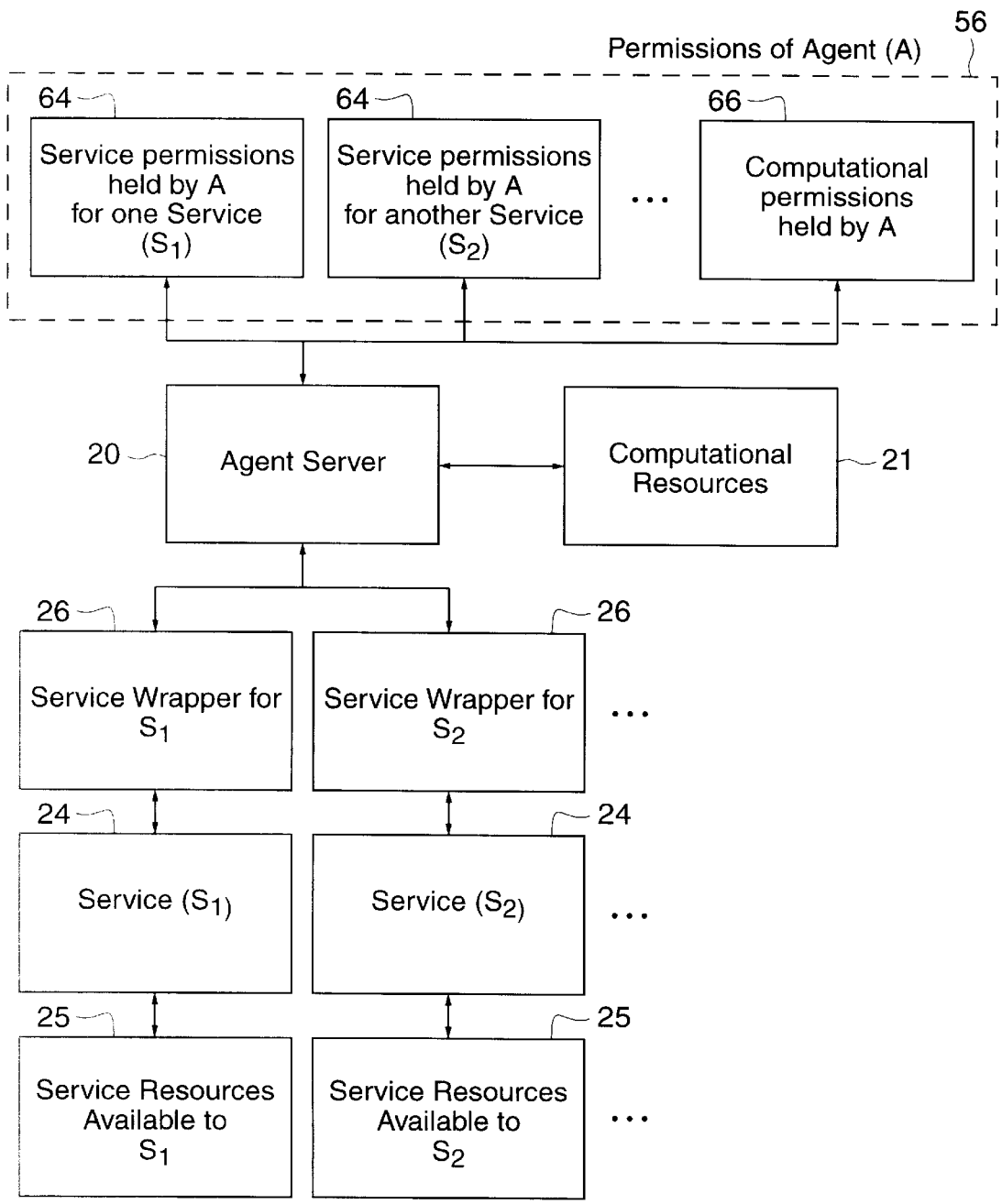
FIG. 13 is a block diagram detailing the controlled consumption of service and computational resources, according to an embodiment of the present invention.

FIG. 13 is a block diagram detailing the controlled consumption of service resources 25 and computational resources 21 by an agent 22, according to an embodiment of the present invention.

As previously described, an agent 22 may consume various service resources 25 (e.g., long-distance calling time, on-line data access time, etc.) and computational resources 21 (e.g., memory space, processing time, etc.) in the performance of its tasks.

The amount of the resources consumed by a particular agent 22 is limited by permissions which are specified in permissions component 56 of an agent object 46 corresponding to the agent 22. More specifically, for a particular agent 22, permissions component 56 includes one set of service permissions 64 for each service 24 utilized by that agent. The service permissions 64 bound the service resources 25 expended on behalf of the agent 22 by that service 24. That is, each service permission 64 specifies whether the agent 22 is authorized to consume a particular service resource 25 and, in some instances, the amount of such service resource 25 that is allowably consumed by that agent 22.

Agent server 20 and service wrappers 26 cooperate in order to ensure that an agent 22 does not consume more than its allotted amount of any particular service resource 25 as specified by a respective service permission 64.

Permissions component 56 also includes a set of computational permissions 66 for the agent 22. These computational permissions 66 bound the computational resources 21 expended on the agent's behalf by agent server 20. In other words, each computational permission 66 specifies whether the agent 22 is authorized to consume a particular computational resource 21 and, in some instances, the amount of the computational resource 21 which is allowably consumed by that agent.

Agent server 20, together with service wrappers 26, monitors and ensures that the agent 22 does not consume more than its allotted amount of any computational resource 21 as specified by a respective computational permission 66.

Agent Population Execution

Figure 14:
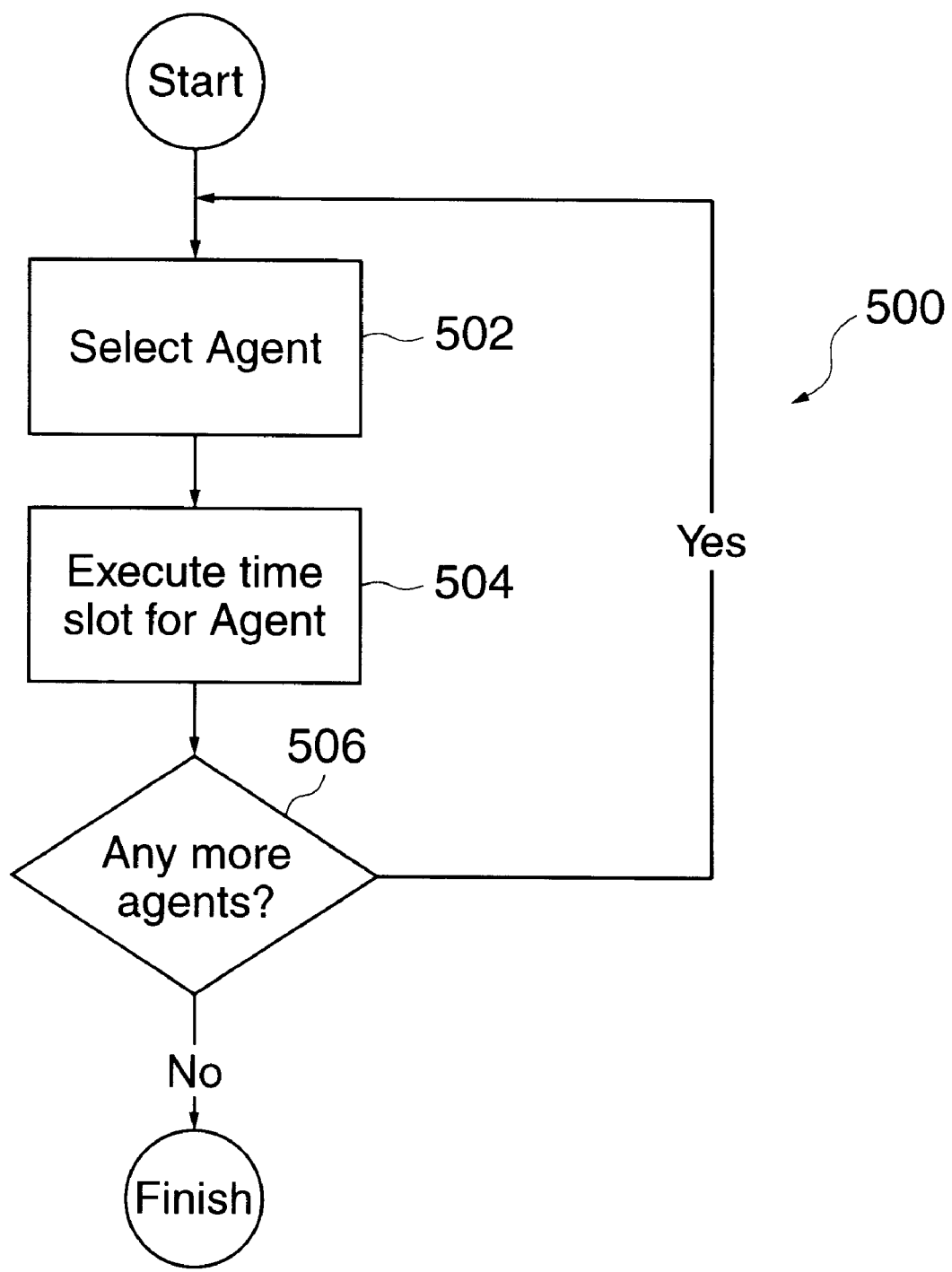
FIG. 14 is a flow diagram of an exemplary method for executing time slices for an agent population, according to an embodiment of the present invention.

FIG. 14 is a flow diagram of an exemplary method 500 for executing time slices for an agent population, according to an embodiment of the present invention. Method 500 is performed by agent server 20 in order to enable each agent 22 to make progress in performing its respective tasks.

In general, the processing capability of agent server 20 cannot be dedicated solely to any particular agent 22, but rather must be allocated among all executing agents. Processing time by agent server 20 is thus divided into time slices. The time slices can be of predetermined duration. During each time slice, the processing capability of agent server 20 is directed to a particular agent 22.

With reference to FIG. 14, method 500 begins at step 502 where agent server 20 selects an agent 22, which is responsible for performing one or more tasks for a respective user. At step 504, agent server 20 executes a time slice for the selected agent 22. During this time slice, the processing capability of server 20 is directed to or used for the selected agent 22.

At step 506, agent server 20 determines whether there are any other agents 22 for which a time slice should be executed. If there are more agents, method 500 returns to step 502 where the next agent is selected. Agent server 20 repeats steps 502–506 until a time slice has been executed for each agent 22. Afterwards, method 500 ends.

Agent Execution

Figure 15:
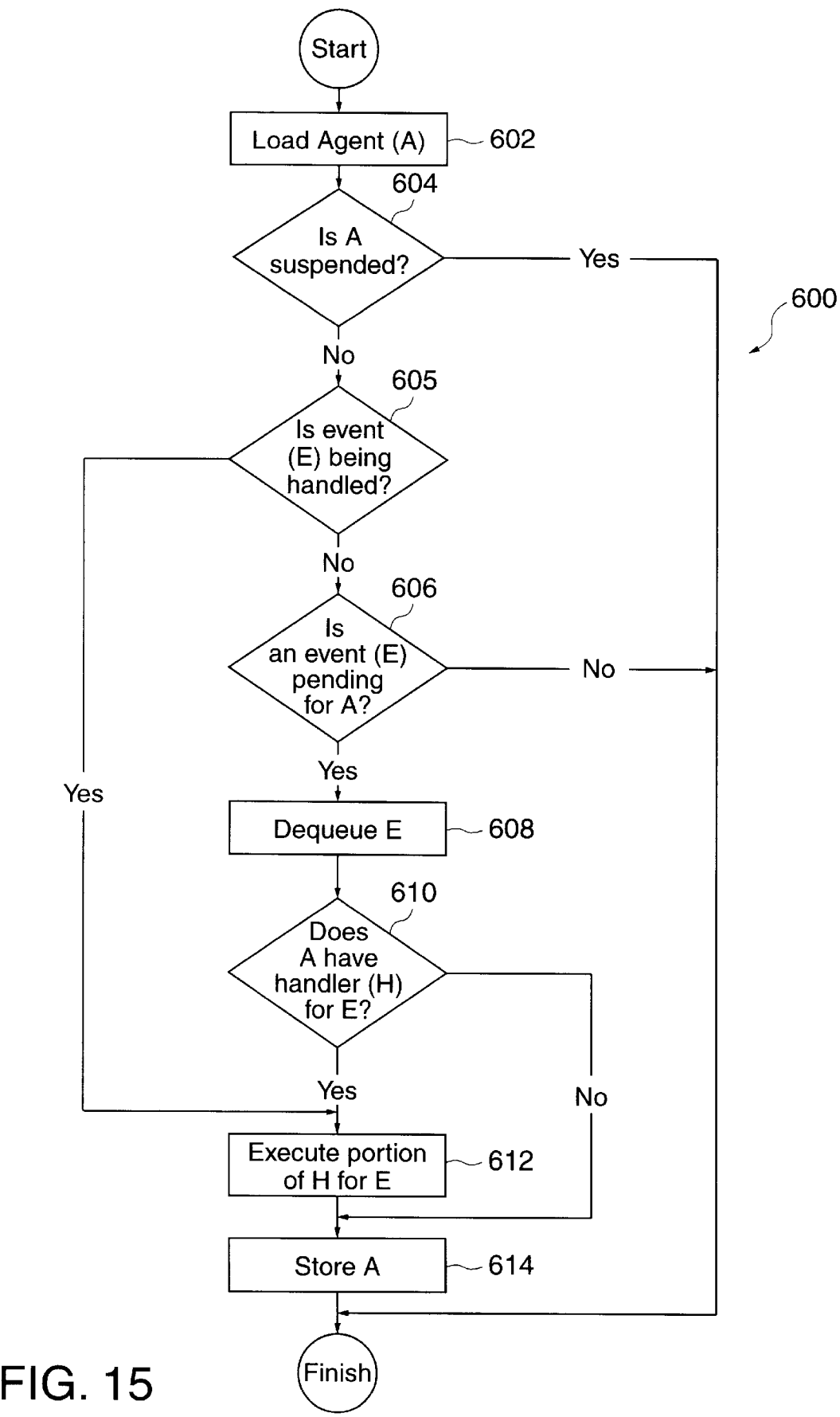
FIG. 15 is a flow diagram of an exemplary method for executing a time slice for an agent, according to an embodiment of the present invention.

FIG. 15 is a flow diagram of an exemplary method 600 for executing a time slice for an agent 22, according to an embodiment of the present invention. Method 600 is performed by agent server 20 for a particular agent 22.

Method 600 begins at step 602 where an agent object 46 corresponding to the particular agent 22 is loaded into agent server 20. This agent object 46 comprises a permissions component 56, an event handlers component 58, a datastore component 60, and a pending event queue 62.

At step 604, agent server 20 determines whether execution of the agent 22 has been suspended (e.g., because the user is editing the agent). If execution has been suspended, it is unnecessary to provide any processing for the agent, and accordingly, method 600 ends.

Otherwise, if execution of the agent 22 has not been suspended, method 600 proceeds to step 605 where agent server 20 determines whether an event is currently being handled by agent 22. An event is something that triggers or causes an agent 22 to take action, or something to which agent 22 must respond. If it is determined that there is an event currently being handled, method 600 moves to step 612.

Alternatively, if it is determined at step 605 that there is not an event currently being handled, method 600 proceeds to step 606 where agent server 20 determines whether there is an event pending for the agent—i.e., an event for which handling has not yet begun. This can be accomplished by examining pending event queue component 62 of the corresponding agent object 46. If there is no event pending for agent 22, method 600 ends.

Otherwise, if it is determined that there is an event pending for agent 22, then at step 608 agent server 20 removes or dequeues the event from the pending event queue of the corresponding agent object 46.

At step 610, agent server 20 determines whether agent 22 has a handler for responding to the event. Generally, an event handler comprises a routine for responding to an event of a particular type. An event handler can be divided into a plurality of portions, each of which is separately executable during different time slices. Event handlers are specified in the event handlers component 58 of agent object 46. If it is determined that agent 22 does not have a handler for the relevant event, method 600 moves to step 614. Otherwise, if it is determined that agent 22 does have a handler for responding to the event, method 600 moves to 612.

At step 612, agent server 20 executes a portion of the event handler for agent 22. Method 600 then proceeds to step 614.

At step 614, agent server 20 stores the agent 22, after which method 600 ends.

Event Handler Execution

Figure 16:
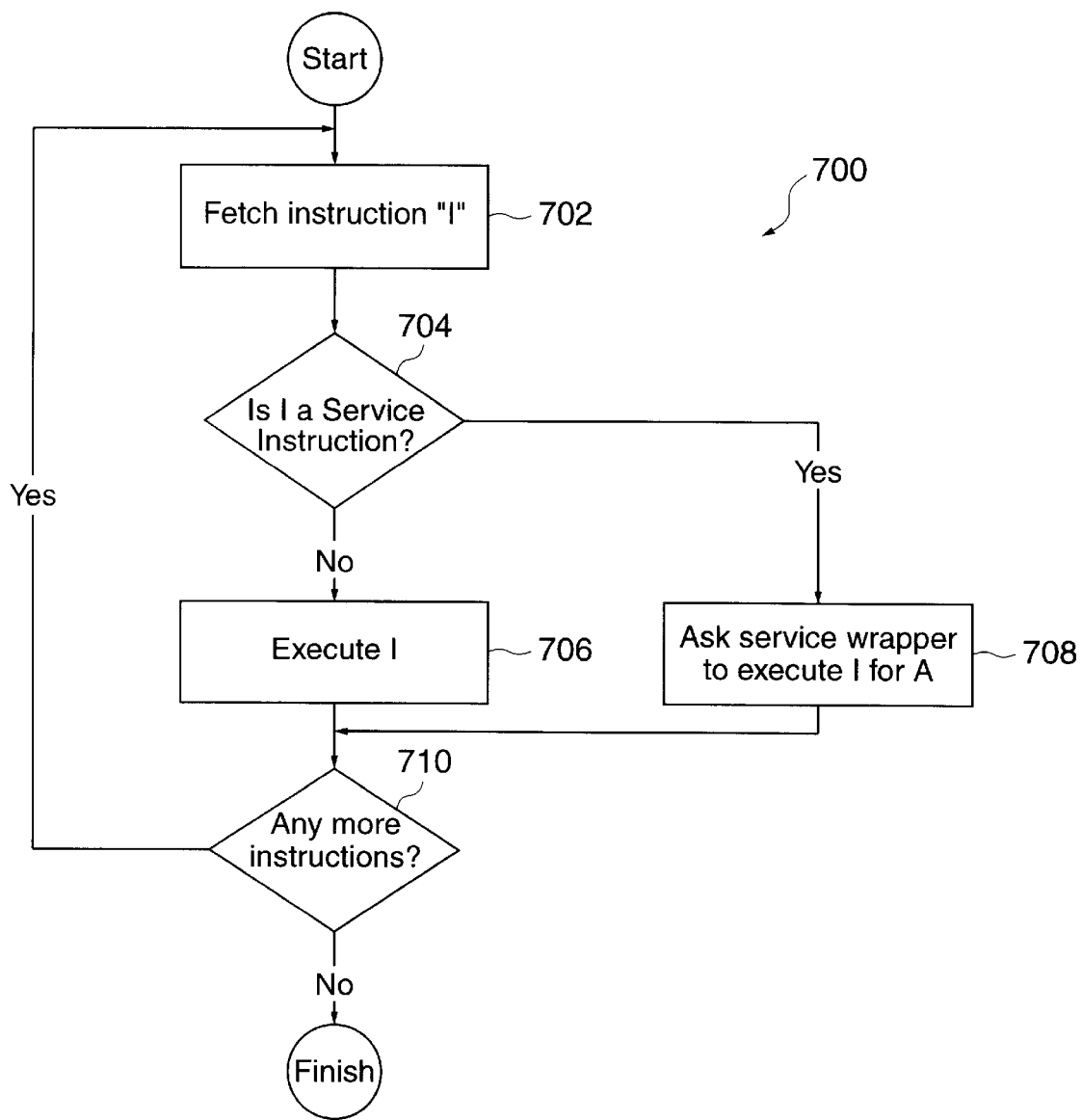
FIG. 16 is a flow diagram of an exemplary method for executing an event handler, according to an embodiment of the present invention.

FIG. 16 is a flow diagram of an exemplary method 700 for executing an event handler, according to an embodiment of the present invention. Method 700 is performed by agent server 20 when an event handler is invoked in response to the occurrence of a particular event. The event handler routine may include a number of instructions which are directed to agent server 20 and/or one or more service wrappers 26.

Method 700 begins its step 702 where agent server 20 receives an instruction to execute in a patroller time slice. At step 704, agent server 20 determines whether the instruction is a service instruction. A service instruction is an instruction relating to and utilizing a particular service 24. Accordingly, a service instruction can only be executed via a respective service wrapper 26. All other instructions do not require the cooperation of a respective service wrapper 26, but rather, can be executed by agent server 20 itself.

If it is determined at step 704 that the instruction is a service instruction, method 700 proceeds to step 708 where agent server 20 asks the respective service wrapper 26 to execute the instruction for agent 22. Method 700 then moves to step 710.

Referring again to step 704, if it is determined that the instruction is not a service instruction, then agent server 20 itself executes the instruction at step 706. Method 700 then proceeds to step 710.

At step 710, agent server 20 determines whether there are any more instructions in the event handler. If so, method 700 returns to step 702 where agent server 20 fetches the next instruction. Agent server 20 repeats steps 702–710 until all instructions of the event handler to be executed as part of the current time slice have been executed, either by agent server 20 or respective service wrappers 26. Afterwards, method 700 ends.

Service Instruction Execution

Figure 17:
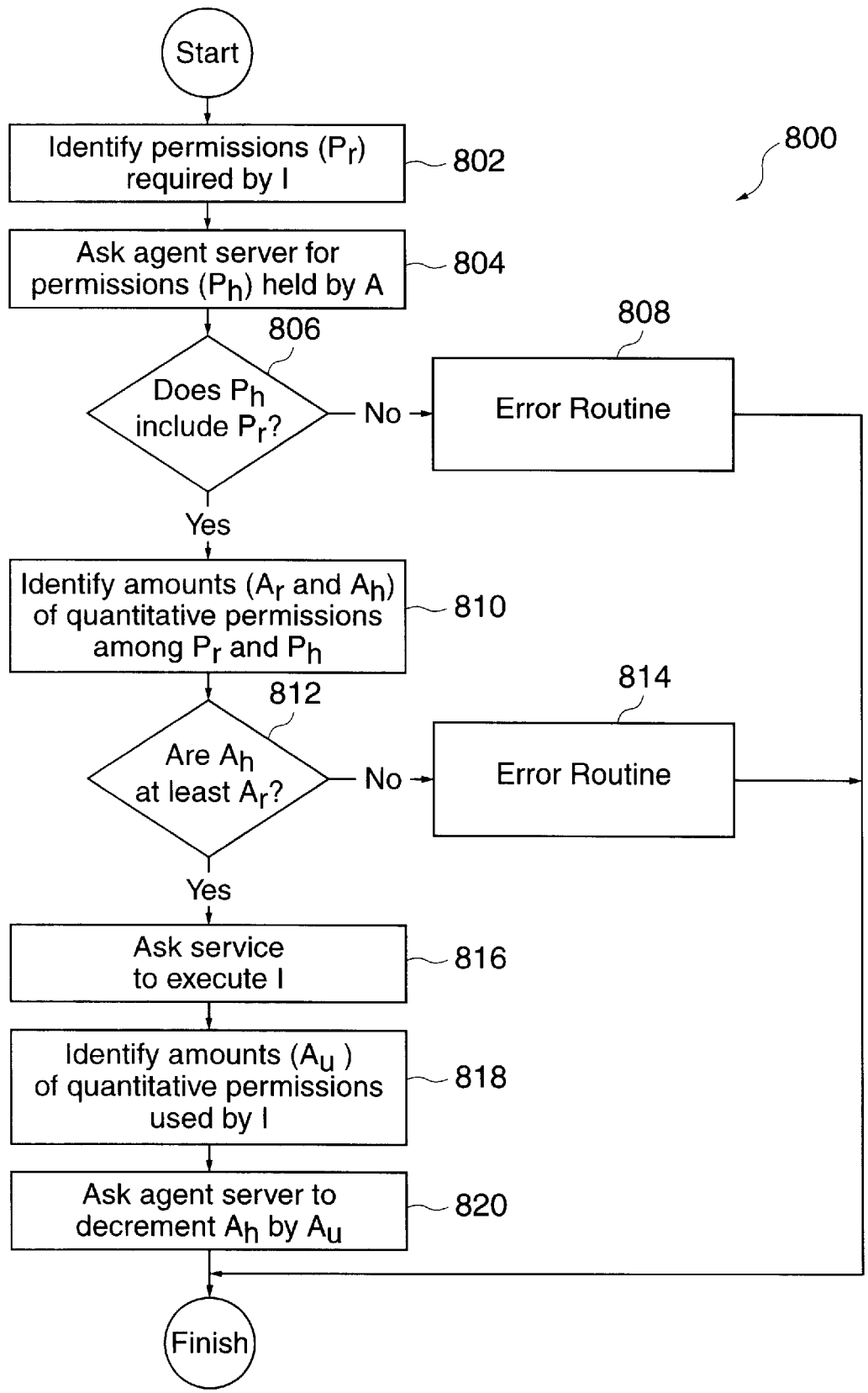
FIG. 17 is a flow diagram of an exemplary method for executing a service instruction, according to an embodiment of the present invention.

FIG. 17 is a flow diagram of an exemplary method 800 for executing a service instruction, according to an embodiment of the present invention. Method 800 is performed by a service wrapper 26 when agent server 20 asks the service wrapper to execute a service instruction relating to the respective service 24.

Method 800 begins at step 802 where service wrapper 26 identifies the service permissions required by the service instruction. In other words, the execution of the service instruction may cause particular service resources 25 (e.g., long-distance calling time, on-line data access time, or memory storage space) to be consumed. Thus, an assessment is made as to the service permissions needed in order to carry out the service instruction.

At step 804, service wrapper 26 asks agent server 20 for the permissions held by the agent 22 for which the instruction is being executed. The permissions held by an agent 22 are not necessarily the same as the permissions which are required in order to execute an instruction. For example, agent 22 may have permissions only for long-distance calling time and memory storage space, but execution of the instruction requires permission for on-line data access time.

Thus, at step 806, service wrapper 26 determines whether the permissions held by agent 22 include the permissions required in order to execute the instruction. If it is determined that the permissions held do not include the permissions required, service wrapper 26 executes an error routine at step 808, after which method 800 ends.

Otherwise, if it is determined at step 806 that the permissions held do include the permissions required, method 800 precedes to step 810 where, for each service permission, service wrapper 26 identifies the amount of a service resource 25 which is allotted to agent 22 and the amount of that service resource 25 which must be consumed in order to execute the instruction. As with the permissions, the amount of a service resource 25 allotted to an agent 22 is not necessarily the same as the amount of that service resource 25 which is required to execute the instruction. For example, an agent 22 may have permission to utilize up to a predefined amount of memory storage space to store a voice mail message, but the actual amount required for a particular message is greater than the predefined amount.

At step 812, service wrapper 26 determines whether the amount allotted to agent 22 is at least as great as the amount required to execute the instruction. If it is determined that the amount allotted is not at least as great as the amount required, service wrapper 26 executes an error routine at step 814, after which method 800 ends.

Referring again to step 812, if it is determined that the amount of the service resource 25 allotted to agent 22 is at least as great as the amount which is required to execute the instruction, then method 800 moves to step 816 where service wrapper 26 asks the respective service 24 to execute the instruction, thereby enabling agent 22 to perform one or more tasks for its user/principal.

At step 818, service wrapper 26 identifies the amount of each service resource 25 actually consumed or used to execute the instruction. At step 820, for each service resource 25, service wrapper 26 asks agent server 20 to decrement the amount allotted to agent 22 by the amount actually used. Method 800 then ends.

In method 800 described above, it is assumed that service wrapper 26 can determine in advance what amount of service resource 25 will be consumed in the execution of an instruction. This, however, is not always the case. For example, while a predefined maximum amount of memory space may be set aside to store any given voice mail message, the amount of storage space actually consumed depends on how long the caller speaks. Other service resources 25 can be consumed on an on-going basis even after an instruction has executed. For example, if a long-distance call is made on behalf of a subscriber, connect time for a long-distance service continues until the call has been completed. In both cases, service wrapper 26 actively monitors service resource consumption and halts further consumption whenever the amount held by an agent 22 is exhausted.

Accordingly, the present invention provides a system and method which allow subscribers or third parties to create and customize personalized agents 22 which utilize services 24 (e.g., e-mail, voice mail, electronic address book, electronic contact book, etc.) in order to perform respective tasks for the subscribers. Thus, the present invention affords user extensibility of the services 24.

Furthermore, the present invention monitors and controls the consumption of service resources 25 and computational resources 21 by agents 22 during execution. Thus, the present invention protects the subscribers and a service provider from misuse or overuse, whether intentional or inadvertent, of such resources.

While particular embodiments of the present invention and their advantages have been shown and described, it should be understood that various changes, substitutions, and alterations can be made therein without departing from the spirit and scope of the invention as defined by the appended claims.

What is claimed is:

1. A network system comprising:
    a telephony service;
    an agent operable to use the telephony service on behalf of a principal;
    a service resource which can be consumed by the agent when the agent uses the telephony service; and
    an agent server operable to mediate the use of the telephony service by the agent.

2. The network system of claim 1 further comprising a service wrapper associated with the service, the service wrapper operable to monitor the consumption of the service resource by the agent.

3. The network system of claim 2 wherein the service wrapper is operable to terminate the agent in response to the monitoring.

4. The network system of claim 1 wherein the agent server is operable to charge the principal for the consumption of the service resource.

5. The network system of claim 1 further comprising a service permission associated with the service resource and the agent, the service permission specifying a predetermined amount of the service resource which the agent is allowed to consume.

6. The network system of claim 1 further comprising a service permission associated with the service resource and the principal, the service permission specifying a predetermined amount of the service resource which is allowed to be consumed on behalf of the principal.

7. The network system of claim 1 wherein the service resource comprises elapsed time for a telephone call.

8. The network system of claim 1 wherein the service resource comprises cost for a telephone call.

9. The network system of claim 1 further comprising a service wrapper associated with the service, the service wrapper operable to translate between a first instruction set and a second instruction set.

10. The network system of claim 1 further comprising a user interface coupled to the agent server, the user interface operable to allow a user to create, modify, or delete an agent template from which the agent is created.

11. The network system of claim 1 further comprising a user interface coupled to the agent server, the user interface operable to allow a user to create, modify, or delete the agent.

12. The network system of claim 11 wherein the user interface comprises a graphical user interface.

13. The network system of claim 12 wherein the graphical user interface comprises:
    a web server resident in the network system; and
    a web browser resident in a user device.

14. The network system of claim 11 wherein the user interface comprises a voice user interface.

15. The network system of claim 14 wherein the voice user interface comprises a speech recognition application.

16. The network system of claim 14 wherein the voice user interface comprises a speech synthesis application.

17. The network system of claim 14 wherein the voice user interface comprises a speech playback device.

18. The network system of claim 1 wherein the service comprises a user interface service operable to provide a user interface by which the agent can interact with a user.

19. The network system of claim 18 wherein the user interface comprises a graphical user interface.

20. The network system of claim 19 wherein the graphical user interface comprises:
a web server resident in the network system; and
a web browser resident in a user device.

21. The network system of claim 19 wherein the user interface comprises a voice user interface.

22. The network system of claim 21 wherein the voice user interface comprises a speech recognition application.

23. The network system of claim 21 wherein the voice user interface comprises a speech synthesis application.

24. The network system of claim 21 wherein the voice user interface comprises a speech playback device.

25. A network system comprising:
a user interface operable to allow a user to interact with the network system; and
an agent server coupled to the user interface, the agent server operable to manage the operation of a programmable functionality component of the network system, the agent server in conjunction with the user interface operable to create, modify, or delete an agent in response to interaction by the user, the agent operable to consume a service resource as the agent uses a telephony service on behalf of the user.

26. The network system of claim 25 wherein the user interface comprises a graphical user interface.

27. The network system of claim 26 wherein the graphical user interface comprises a web browser application.

28. The network system of claim 24 wherein the user interface comprises a voice user interface.

29. The network system of claim 28 wherein the voice user interface comprises a speech recognition application.

30. The network system of claim 28 wherein the voice user interface comprises a speech synthesis application.

31. The network system of claim 28 wherein the voice user interface comprises a speech playback device.

32. The network system of claim 25 wherein the user interface comprises an agent area for creating, modifying, or deleting the agent.

33. The network system of claim 25 further comprising
a service wrapper associated with the telephony service, the service wrapper operable to cooperate with the agent server to mediate interaction between the telephony service and the agent.

34. The network system of claim 33 wherein the service wrapper is operable to convert between a first computer language used by the agent and a second computer language used by the telephony service.

35. The network system of claim 25 wherein the service wrapper is operable to monitor the amount of service resource consumed by the agent when the agent utilizes the telephony service.

36. A method comprising:
admitting a user to a network system wherein at least one agent is operable to consume a service resource while utilizing a telephony service to perform a task for the user; and
allowing the user to create, modify, or delete the agent within the network system.

37. The method of claim 36 further comprising accepting an agent command from the user.

38. The method of claim 37 wherein the agent command is one of a create agent command, an edit agent command, and a delete agent command.

39. The method of claim 37 further comprising suspending execution of the agent.

40. The method of claim 37 further comprising accepting a template command from the user.

41. The method of claim 40 further comprising allowing the user to create, modify, or delete an agent template within the network system.

42. The method of claim 36 further comprising admitting the user to an agent area of a user interface.

43. A network system comprising:
an agent server operable to manage the operation of a programmable functionality component of the network system;
a telephony service;
an agent operable to consume a service resource while utilizing the telephony service; and
a service wrapper associated with the telephony service, the service wrapper operable to cooperate with the agent server to mediate interaction between the telephony service and the agent.

44. The network system of claim 43 wherein the service wrapper comprises a monitor, the monitor operable to monitor the amount of the service resource consumed by the agent when the agent utilizes the telephony service.

45. The network system of claim 43 wherein the service wrapper comprises a converter, the converter operable to convert between a first computer language used by the agent and a second computer language used by the telephony service.

46. The network system of claim 45 wherein the converter comprises an agent server to service converter for converting from the first computer language to the second computer language.

47. The network system of claim 45 wherein the converter comprises a service to agent server converter for converting from the second computer language to the first computer language.

48. The network system of claim 43 further comprising a user interface operable to allow a user to interact with the network system in order to create the agent.

49. The network system of claim 48 wherein the user interface comprises a graphical user interface.

50. The network system of claim 49 wherein the graphical user interface comprises a web browser application.

51. The network system of claim 48 wherein the user interface comprises a voice user interface.

52. The network system of claim 51 wherein the voice user interface comprises a speech recognition application.

53. The network system of claim 51 wherein the voice user interface comprises a speech synthesis application.

54. The network system of claim 51 wherein the voice user interface comprises a speech playback device.

55. The network system of claim 43 further comprising an agent object associated with the agent and resident in the agent server, the agent object comprising data and instructions executable within the agent server.

56. The network system of claim 43 further comprising an agent object associated with the agent and resident in the agent server, the agent object comprising a permission for the agent.

57. A method comprising:
allowing an agent to utilize a service; and
mediating interaction between the service and the agent.

58. The method of claim 57 wherein allowing comprises allowing the agent to consume a service resource associated with the service.

59. The method of claim 57 wherein mediating comprises monitoring the amount of a service resource consumed by the agent.

60. The method of claim 57 wherein mediating comprises:

identifying a service permission required in order for the agent to consume the service resource; and determining whether the agent holds the required service permission.

61. The method of claim 57 wherein mediating comprises:

receiving an instruction which requires that the agent consume the service resource associated with the service when the agent utilizes the telephony service;

identifying an amount of the service resource which would be consumed if the instruction is executed;

identifying an amount of the service resource allotted to the agent; and determining whether the amount which is allotted is greater than or equal to the amount which would be consumed.

62. The method of claim 61 wherein mediating comprises:

executing the instruction if the amount which is allotted is greater than or equal to the amount which would be consumed; and subtracting the amount which would be consumed from the amount which is allotted.

63. The method of claim 57 further comprising converting between a first computer language used by an agent and a second computer language used by the service.

* * * * *

UNITED STATES PATENT AND TRADEMARK OFFICE
CERTIFICATE OF CORRECTION

| | |
|---|---|
| PATENT NO. | : 6,163,794 |
| APPLICATION NO. | : 09/178366 |
| DATED | : December 19, 2000 |
| INVENTOR(S) | : Lange et al. |

It is certified that error appears in the above-identified patent and that said Letters Patent is hereby corrected as shown below:

Column 28
Line 66, please replace "allowing an agent to utilize a service; and" with --allowing an agent to consume a service resource while utilizing a telephony service; and--.

Column 28
Line 67, please replace "mediating interaction between the service and the agent." with --mediating interaction between the telephony service and the agent.--.

Signed and Sealed this

Fourth Day of August, 2009

JOHN DOLL
*Acting Director of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 6,163,794 | |
| APPLICATION NO. | : 09/178366 | |
| DATED | : December 19, 2000 | |
| INVENTOR(S) | : Lange et al. | |

It is certified that error appears in the above-identified patent and that said Letters Patent is hereby corrected as shown below:

On the Title Pg.
Please include all references (U.S. Patent Documents A-K and M) cited in Notice of References Item (56) should read,

U.S. PATENT DOCUMENTS

| | Document Number | Date | Name | Class | Subclass |
|---|---|---|---|---|---|
| A | 6,067,568 | 5/23/00 | Li et al. | 709 | 223 |
| B | 6,016,520 | 1/18/00 | Facq et al. | 710 | 33 |
| C | 5,983,267 | 11/9/99 | Shklar et al. | 709 | 217 |
| D | 5,983,190 | 11/9/99 | Trower, II et al. | 704 | 276 |
| E | 5,974,441 | 10/26/99 | Rogers et al. | 709 | 200 |
| F | 5,963,949 | 10/5/99 | Gupta et al. | 707 | 100 |
| G | 5,913,214 | 6/15/99 | Madnick et al. | 707 | 10 |
| H | 5,826,258 | 10/20/98 | Gupta et al. | 707 | 4 |
| I | 5,655,081 | 8/5/97 | Bonnell et al. | 709 | 202 |
| J | 6,016,393 | 1/18/00 | White et al. | 395 | 683 |
| K | 5,953,392 | 9/14/99 | Rhie et al. | 379 | 88,13 |
| M | 5,603,031 | 2/11/97 | White et al. | 295 | 683 |

Signed and Sealed this
Sixteenth Day of August, 2011

David J. Kappos
*Director of the United States Patent and Trademark Office*